US012598624B2

(12) United States Patent
Zhou et al.

(10) Patent No.:  US 12,598,624 B2
(45) Date of Patent:       Apr. 7, 2026

(54) FEEDBACK CORRESPONDING TO UNIFIED TRANSMISSION CONFIGURATION INDICATIONS IN DOWNLINK CONTROL INFORMATION WITHOUT DOWNLINK ASSIGNMENTS

(71) Applicant: QUALCOMM Incorporated, San Diego, CA (US)

(72) Inventors: Yan Zhou, San Diego, CA (US); Fang Yuan, Beijing (CN); Tianyang Bai, Somerville, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/262,298

(22) PCT Filed: Mar. 12, 2021

(86) PCT No.: PCT/CN2021/080380

§ 371 (c)(1),
(2) Date: Jul. 20, 2023

(87) PCT Pub. No.: WO2022/188130

PCT Pub. Date: Sep. 15, 2022

(65) Prior Publication Data

US 2024/0080857 A1      Mar. 7, 2024

(51) Int. Cl.
*H04W 72/232*       (2023.01)
*H04L 1/1812*       (2023.01)
(Continued)

(52) U.S. Cl.
CPC ......... *H04W 72/232* (2023.01); *H04L 1/1812* (2013.01); *H04L 5/0053* (2013.01);
(Continued)

(58) Field of Classification Search
CPC ......... H04W 72/1273; H04W 72/0446; H04W 72/232; H04L 5/0053; H04L 1/1812
(Continued)

(56) References Cited

U.S. PATENT DOCUMENTS 11,665,692 B2 *  5/2023  Farag ..................... H04L 5/0091
                                                          370/329
11,764,908 B2 *  9/2023  Kim ...................... H04L 1/1893
                                                          370/329
(Continued)

FOREIGN PATENT DOCUMENTS

CN        110798295 A      2/2020
WO     WO-2019075308 A1    4/2019
WO     WO-2022150363 A1 *  7/2022  ........... H04L 5/0094

OTHER PUBLICATIONS

NTT Docomo Inc: "Discussion on Multi-beam Operation", R1-2101597, 3GPP TSG RAN WG1 #104-e, e-Meeting, Jan. 25-Feb. 5, 2021, Jan. 19, 2021, 21 Pages.
(Continued)

*Primary Examiner* — Peter G Solinsky
(74) *Attorney, Agent, or Firm* — Harrity & Harrity, LLP

(57)                ABSTRACT

Various aspects of the present disclosure generally relate to wireless communication. In some aspects, a user equipment (UE) may receive, in a first slot, a downlink control information (DCI) transmission that indicates a unified transmission configuration indicator (TCI), wherein the DCI transmission does not include a downlink assignment. The UE may transmit hybrid automatic repeat request (HARQ) feedback corresponding to the unified TCI, wherein the HARQ feedback comprises an acknowledgment to indicate successful reception of the unified TCI in the DCI transmission or a negative acknowledgement to indicate a failed reception of the unified TCI in the DCI transmission. Numerous other aspects are described.

30 Claims, 18 Drawing Sheets

1600 ⟶

1610 ~ Transmit, in a first slot, a downlink control information (DCI) transmission that indicates a unified transmission configuration indicator (TCI), wherein the DCI transmission does not include a downlink assignment 1620 ~ Receive hybrid automatic repeat request (HARQ) feedback corresponding to the unified TCI, wherein the HARQ feedback comprises an acknowledgment (ACK) to indicate successful reception of the unified TCI in the DCI transmission or a negative acknowledgement (NACK) to indicate a failed reception of the unified TCI in the DCI transmission

(51) Int. Cl.

| | |
|---|---|
| *H04L 5/00* | (2006.01) |
| *H04W 72/0446* | (2023.01) |
| *H04W 72/1273* | (2023.01) |
| *H04W 76/20* | (2018.01) |

(52) U.S. Cl.
CPC ... *H04W 72/0446* (2013.01); *H04W 72/1273* (2013.01); *H04W 76/20* (2018.02)

(58) Field of Classification Search
USPC .......................................................... 370/329
See application file for complete search history.

(56) References Cited

U.S. PATENT DOCUMENTS

| | | | |
|---|---|---|---|
| 2018/0077693 | A1 | 3/2018 | Chen et al. |
| 2019/0115955 | A1 | 4/2019 | John Wilson et al. |
| 2019/0222289 | A1 | 7/2019 | John Wilson et al. |
| 2019/0297637 | A1 | 9/2019 | Liou et al. |
| 2021/0359745 | A1* | 11/2021 | Farag .................... H04L 1/0071 |
| 2022/0015082 | A1* | 1/2022 | Farag .................... H04B 7/088 |
| 2023/0336314 | A1* | 10/2023 | Wong .................... H04L 1/1896 |
| 2024/0089943 | A1* | 3/2024 | Yu .......................... H04L 1/1854 |
| 2025/0039890 | A1* | 1/2025 | Farag .................... H04L 1/1861 |

OTHER PUBLICATIONS

OPPO: "Enhancements on Multi-Beam Operation", 3GPP TSG RAN WG1 #104-e, R1-2100118, e-Meeting, Jan. 25, 2021-Feb. 5, 2021, Jan. 18, 2021, 25 pages.

SAMSUNG: "Multi-Beam Enhancements", 3GPP TSG RAN WG1 #104-e, R1-2101186, e-Meeting, Jan. 25, 2021-Feb. 5, 2021, Jan. 18, 2021, pp. 1-22.

SONY: "Further Enhancement on Multi-Beam Operation", 3GPP TSG RAN WG1#104e, R1-2100844, E-meeting, Jan. 25, 2021-Feb. 5, 2021, Jan. 19, 2021, 18 Pages.

Supplementary European Search Report—EP21929608—Search Authority—Munich—Jan. 9, 2025.

NTT Docomo Inc: "Discussion on Multi-beam Operation", 3GPP TSG RAN WG1 #104-e, R1-2101597, 3rd Generation Partnership Project (3GPP), Mobile Competence Centre, 650, Route Des Lucioles, F-06921 Sophia-Antipolis Cedex, France, e-Meeting, Jan. 25-Feb. 5, 2021, 20 Pages, Jan. 19, 2021, XP051971752, section 3.1.

OPPO: "Enhancements on Multi-Beam Operation", 3GPP TSG RAN WG1 #104-e, R1-2100118, 3rd Generation Partnership Project (3GPP), Mobile Competence Centre, 650, Route Des Lucioles, F-06921 Sophia-Antipolis Cedex, France, e-Meeting, Jan. 25-Feb. 5, 2021, 25 Pages, Jan. 18, 2021, XP051970240, section 3.1.2.

SAMSUNG: "Multi-beam Enhancements", 3GPP TSG RAN WG1 #104-e, R1-2101186, 3rd Generation Partnership Project (3GPP), Mobile Competence Centre, 650, Route Des Lucioles, F-06921 Sophia-Antipolis Cedex, France, e-Meeting, Jan. 25-Feb. 5, 2021, 22 Pages, Jan. 18, 2021, XP051971402, section 4.1, p. 8-p. 10, tables 1, 2.

Supplementary Partial European Search Report—EP21929608—Search Authority—The Hague—Oct. 8, 2024.

International Search Report and Written Opinion—PCT/CN2021/080380—ISA/EPO—Dec. 16, 2021.

SAMSUNG: "Moderator Summary#6 for Multi-Beam Enhancement: Round 3B", 3GPP TSG RAN WG1 #104-e, R1-2102112 Feb. 5, 2021(Feb. 5, 2021), e-Meeting, Jan. 25-Feb. 5, 2021, 43 Pages, URL: https://www.3gpp.org/ftp/tsg_ran/WG1_RL1/TSGR1_104-e/Docs/R1-2102112.zip , pp. 38-39.

* cited by examiner

1200

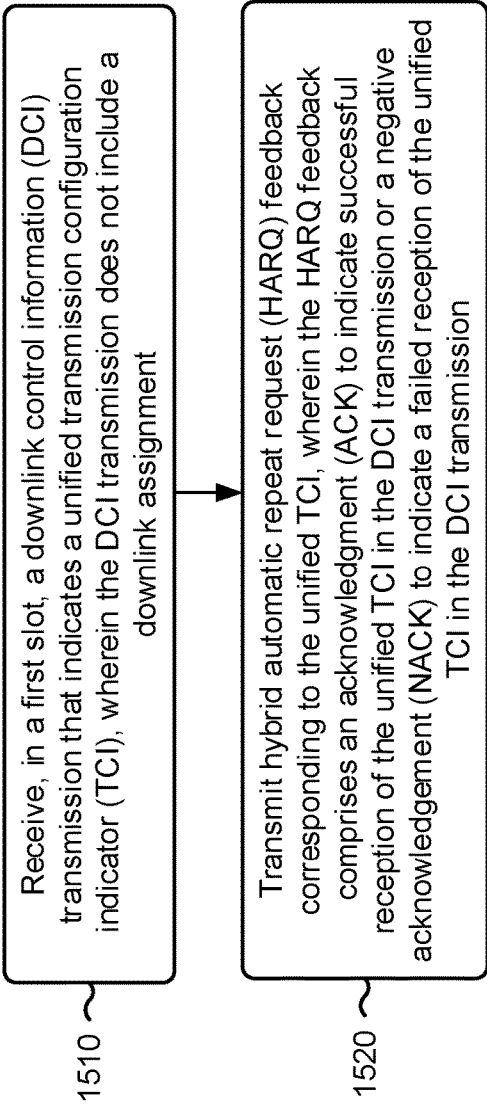

1510

Receive, in a first slot, a downlink control information (DCI) transmission that indicates a unified transmission configuration indicator (TCI), wherein the DCI transmission does not include a downlink assignment

1520

Transmit hybrid automatic repeat request (HARQ) feedback corresponding to the unified TCI, wherein the HARQ feedback comprises an acknowledgment (ACK) to indicate successful reception of the unified TCI in the DCI transmission or a negative acknowledgement (NACK) to indicate a failed reception of the unified TCI in the DCI transmission

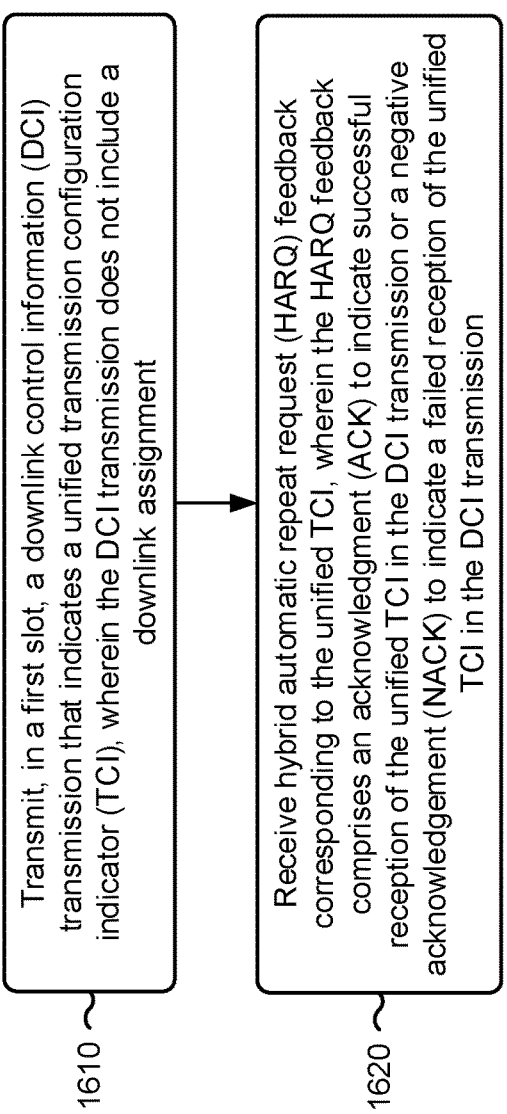

1610 — Transmit, in a first slot, a downlink control information (DCI) transmission that indicates a unified transmission configuration indicator (TCI), wherein the DCI transmission does not include a downlink assignment 1620 — Receive hybrid automatic repeat request (HARQ) feedback corresponding to the unified TCI, wherein the HARQ feedback comprises an acknowledgment (ACK) to indicate successful reception of the unified TCI in the DCI transmission or a negative acknowledgement (NACK) to indicate a failed reception of the unified TCI in the DCI transmission

FEEDBACK CORRESPONDING TO UNIFIED TRANSMISSION CONFIGURATION INDICATIONS IN DOWNLINK CONTROL INFORMATION WITHOUT DOWNLINK ASSIGNMENTS

CROSS-REFERENCE TO RELATED APPLICATION

This application is a 371 national stage application of PCT Application No. PCT/CN2021/080380 filed on Mar. 12, 2021, entitled "FEEDBACK CORRESPONDING TO UNIFIED TRANSMISSION CONFIGURATION INDICATIONS IN DOWNLINK CONTROL INFORMATION WITHOUT DOWNLINK ASSIGNMENTS," which is hereby expressly incorporated by reference herein.

FIELD OF THE DISCLOSURE

Aspects of the present disclosure generally relate to wireless communication and to techniques and apparatuses associated with feedback corresponding to unified transmission configuration indications in downlink control information without downlink assignments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, in a first slot, a downlink control information (DCI) transmission that indicates a unified transmission configuration indicator (TCI), wherein the DCI transmission does not include a downlink assignment; and transmitting hybrid automatic repeat request (HARQ) feedback corresponding to the unified TCI, wherein the HARQ feedback comprises an acknowledgment (ACK) to indicate successful reception of the unified TCI in the DCI transmission or a negative acknowledgement (NACK) to indicate a failed reception of the unified TCI in the DCI transmission.

In some aspects, a method of wireless communication performed by a base station includes transmitting, in a first slot, a DCI transmission that indicates a unified TCI, wherein the DCI transmission does not include a downlink assignment; and receiving HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, a UE for wireless communication includes a memory; and one or more processors, coupled to the memory, configured to: receive, in a first slot, a DCI transmission that indicates a unified TCI, wherein the DCI transmission does not include a downlink assignment; and transmit HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, a base station for wireless communication includes a memory; and one or more processors, coupled to the memory, configured to: transmit, in a first slot, a DCI transmission that indicates a unified TCI, wherein the DCI transmission does not include a downlink assignment; and receive HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, a non-transitory computer-readable medium storing a set of instructions for wireless communication includes one or more instructions that, when executed by one or more processors of a UE, cause the UE to: receive, in a first slot, a DCI transmission that indicates a unified TCI, wherein the DCI transmission does not include a downlink assignment; and transmit HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, a non-transitory computer-readable medium storing a set of instructions for wireless communication includes one or more instructions that, when executed by one or more processors of a base station, cause the base station to: transmit, in a first slot, a DCI transmission that indicates a unified TCI, wherein the DCI transmission does not include a downlink assignment; and receive HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, an apparatus for wireless communication includes means for receiving, in a first slot, a DCI transmission that indicates a unified TCI, wherein the DCI transmission does not include a downlink assignment; and means for transmitting HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

In some aspects, an apparatus for wireless communication includes means for transmitting, in a first slot, a DCI transmission that indicates a unified TCI, wherein the DCI transmission does not include a downlink assignment; and means for receiving HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 15 and 16 are diagrams illustrating example processes associated with feedback corresponding to unified TCIs in DCI without downlink assignments, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
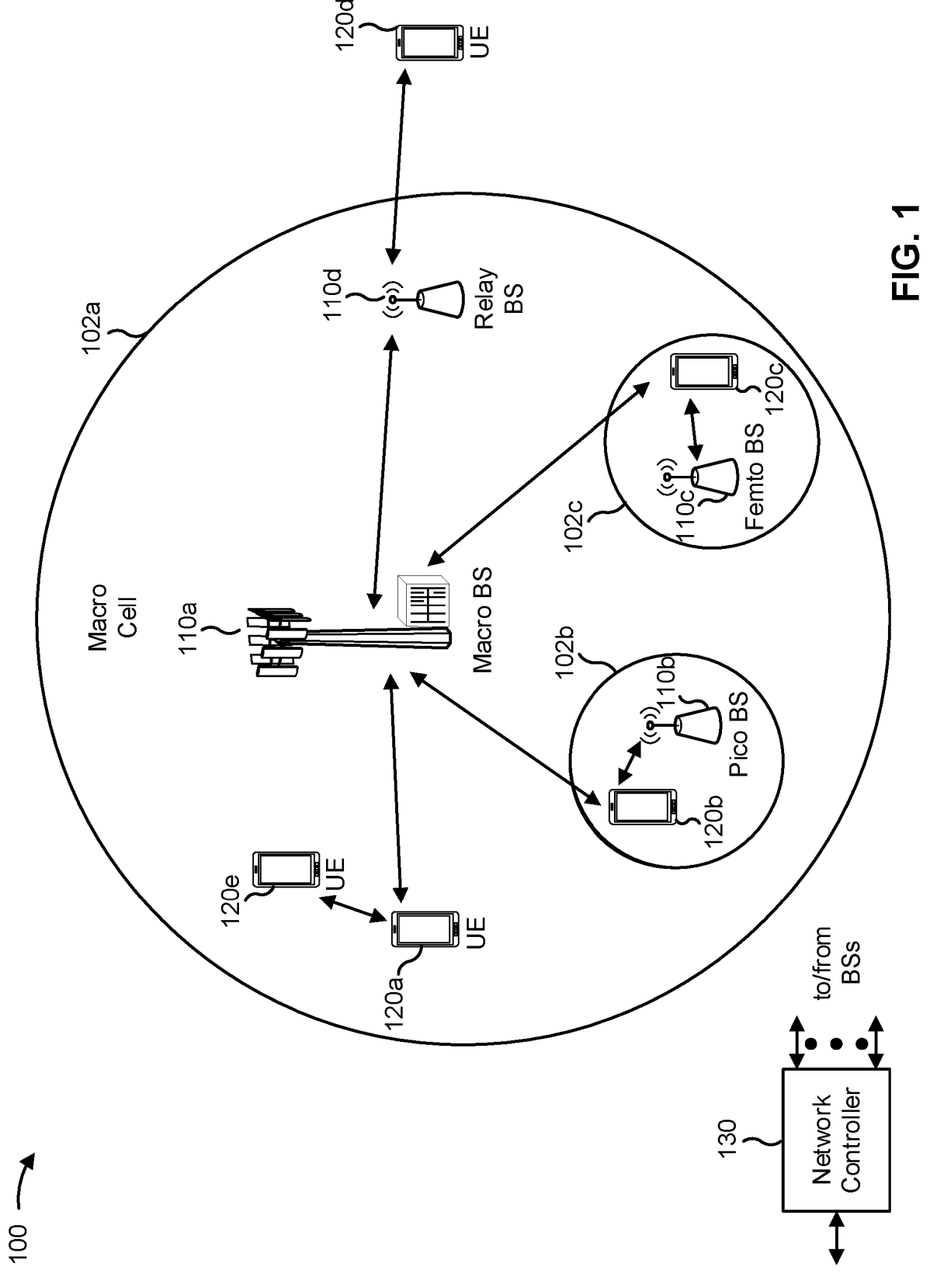
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TR", "A", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
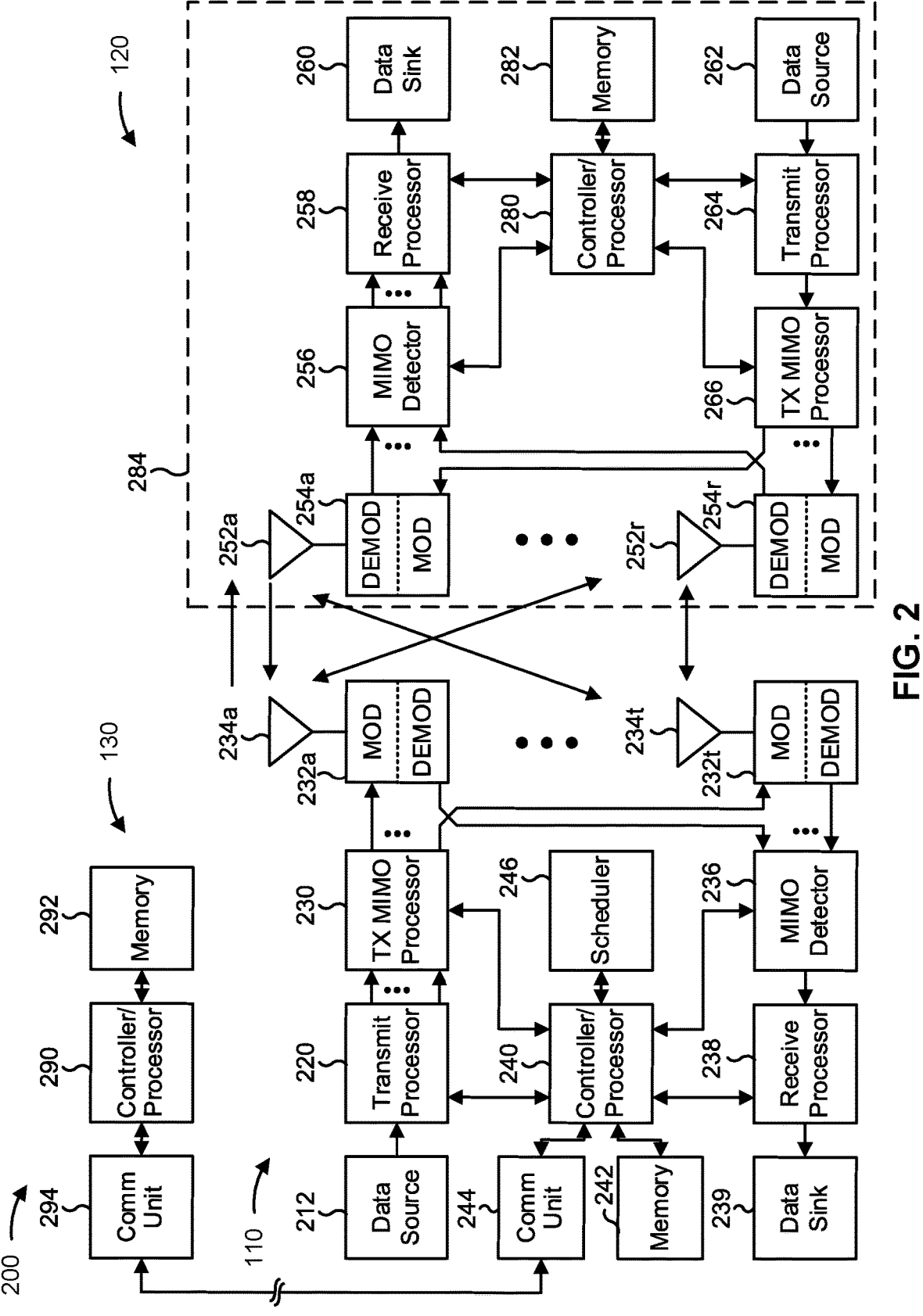
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-16.

Controller/processor 240 of base station 110, controller/processor 280 of UE 120, and/or any other component(s) of FIG. 2 may perform one or more techniques associated with feedback corresponding to unified transmission configuration indications (TCIs) in downlink control information (DCI) without downlink assignments, as described in more detail elsewhere herein. For example, controller/processor 240 of base station 110, controller/processor 280 of UE 120, and/or any other component(s) of FIG. 2 may perform or direct operations of, for example, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, the UE includes means for receiving, in a first slot, a DCI transmission that indicates a unified TCI, wherein the DCI transmission does not include a downlink assignment; or means for transmitting hybrid automatic repeat request (HARQ) feedback corresponding to, and in response to, the unified TCI indication in the DCI transmission, wherein the HARQ feedback comprises an acknowledgment (ACK, as a confirmation) to indicate successful reception of the unified TCI in the DCI transmission or a negative acknowledgement (NACK) to indicate a failed reception of the unified TCI in the DCI transmission. A downlink assignment in a DCI transmission may be an indication of a physical downlink shared channel (PDSCH) with one or more transport blocks to be received by the UE, and if the DCI does not include any downlink assignment, the UE does not need to receive the PDSCH and generate the HARQ feedback for the received PDSCHs. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining a slot of the transmission for the HARQ feedback corresponding to the unified TCI in the DCI not including any downlink assignment. In some aspects, a DCI field in the DCI indicates the value of the slot parameter, and the UE includes means for determining the slot of transmission for the HARQ feedback corresponding to the unified TCI in the DCI not including any downlink assignment based in part on the DCI field. In some aspects, a radio resource control (RRC) message that indicates the value of the slot parameter, and the UE includes means for determining the slot of transmission for the HARQ feedback corresponding to the unified TCI in the DCI not including any downlink assignment based in part on the RRC message.

In some aspects, the UE includes means for determining a PUCCH resource in a PUCCH resource set to transmit the HARQ feedback corresponding to the unified TCI in the DCI not including any downlink assignment. In some aspects, a DCI field in the DCI indicates the PUCCH resource, and the UE includes means for determining the PUCCH resource to transmit the HARQ feedback corresponding to the unified TCI in the DCI not including any downlink assignment based in part on the DCI field. In some aspects, an RRC message indicates the PUCCH resource, and the UE includes means for determining the PUCCH resource to transmit the HARQ feedback corresponding to the unified TCI in the DCI not including any downlink assignment based in part on the RRC message.

In some aspects, the UE may be indicated to transmit multiple ACK/NACK bits in a dynamic HARQ codebook. In some aspects, the UE includes means for determining an ACK/NACK location in a dynamic HARQ-ACK codebook for the HARQ feedback corresponding to the unified TCI in the DCI not including any downlink assignment based at least in part on the downlink assignment index (DAI) field in the DCI.

In some aspects, the UE may be indicated to transmit multiple ACK/NACK bits in a static HARQ codebook. In some aspects, the UE includes means for receiving an RRC message that indicates an ACK/NACK location in a static HARQ-ACK codebook for the HARQ feedback corresponding to the unified TCI in the DCI not including any downlink assignment; or means for determining an ACK/NACK location in the static HARQ-ACK codebook for the HARQ feedback corresponding to the unified TCI in the DCI not including any downlink assignment based at least in part on the RRC message.

In some aspects, the UE includes means for determining an ACK/NACK location in a static HARQ-ACK codebook for the HARQ feedback corresponding to the unified TCI in the DCI not including any downlink assignment based at least in part on an associated PDSCH occasion. In some aspects, the UE includes for determining an ACK/NACK location in the static HARQ-ACK codebook for the HARQ feedback corresponding to the unified TCI in the DCI not including any downlink assignment based at least in part on an associated PDSCH occasion indicated by the time domain resource assignment field in the DCI, and the time domain allocation list configured for PDSCH. In some aspects, the UE includes means for receiving an RRC message that indicates a predetermined PDSCH occasion, and the UE includes means for determining an ACK/NACK location in the static HARQ-ACK codebook for the HARQ feedback corresponding to the unified TCI in the DCI not including any downlink assignment based at least in part on the RRC message.

In some aspects, the UE includes means for determining a location in the static HARQ-ACK codebook for the HARQ feedback corresponding to the unified TCI in the DCI not including any downlink assignment based at least in part on a dedicated bit location in the static HARQ-ACK codebook. In some aspects, the UE includes means for appending one or more dedicated bits to an end of the static HARQ-ACK codebook based at least in part on the DCI transmission. In some aspects, the UE includes means for determining that the unified TCI comprises an updated TCI, and wherein appending the one or more dedicated bits to the end of the static HARQ-ACK codebook comprises appending the one or more dedicated bits to the end of the static HARQ-ACK codebook based at least in part on determining that the unified TCI comprises an updated TCI.

In some aspects, the UE includes means for receiving an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

In some aspects, the UE includes means for determining a first location of the first ACK/NACK bit based at least in part on at least one of a first ACK/NACK location associated with the first DCI transmission or a first PDSCH occasion associated with the first DCI transmission; or means for determining a second location of the second ACK/NACK bit based at least in part on at least one of a second ACK/NACK location associated with the second DCI transmission or a second PDSCH occasion associated with the second DCI transmission.

In some aspects, the UE includes means for determining a first location of the first ACK/NACK bit based at least in part on a dedicated fixed-size location appended to an end of the static HARQ-ACK codebook; or means for determining a second location of the first ACK/NACK bit based at least in part on the dedicated fixed-size location appended to an end of the static HARQ-ACK codebook. In some aspects, the UE includes means for determining a first location of the first ACK/NACK bit based at least in part on a dynamic location appended to an end of the static HARQ-ACK codebook; or means for determining a second location of the first ACK/NACK bit based at least in part on the dynamic location appended to an end of the static HARQ-ACK codebook.

In some aspects, the UE includes means for appending an ACK/NACK bit corresponding to the DCI transmission to an end of the HARQ-ACK codebook. In some aspects, the UE includes means for appending an ACK/NACK bit corresponding to the DCI transmission adjacent an ACK/NACK bit corresponding to the PDSCH transmission in the HARQ-ACK codebook.

In some aspects, the base station includes means for transmitting, in a first slot, a DCI transmission that indicates a unified TCI, wherein the DCI transmission does not include a downlink assignment; or means for receiving HARQ feedback corresponding to the unified TCI, wherein the HARQ feedback comprises an ACK to indicate successful reception of the DCI transmission or a NACK to indicate a failed reception of the DCI transmission. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an RRC message that indicates the value of the slot parameter. In some aspects, the base station includes means for transmitting an RRC message, wherein a determination of the PUCCH resource is based at least in part on the RRC message. In some aspects, the base station includes means for transmitting an RRC message that indicates an ACK/NACK location, wherein a determination of a location in the static HARQ-ACK codebook for the HARQ feedback is based at least in part on the RRC message.

In some aspects, the base station includes means for transmitting an RRC message that indicates the PDSCH occasion, wherein a determination of the location in the static HARQ-ACK codebook for the HARQ feedback is based at least in part on the RRC message. In some aspects, the base station includes means for transmitting an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Wireless communication devices such as UEs and base stations may use beams to facilitate communication with one another. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

Antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array) can be dynamically controlled by modifying the phase shifts or phase offsets of the multiple signals relative to each other.

In 5G and other types of RATs, beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a PDSCH. The base station may indicate an activated TCI state to the UE, which the UE may use to select a beam for receiving the PDSCH.

A beam indication is an indication of a beam. A beam indication may be, or include, a TCI state information element, a beam identifier (ID), spatial relation information, a TCI state ID, a close loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) DCI to indicate joint or separate DL/UL beam indications from active TCI states. In some cases, existing DCI formats 1_0, 1_1, 1_2, 0_1, 0_2, 0_0, and/or 2_x may be reused for beam indication. For example, DCI transmissions may include a beam indication having one of six types of beam indication for unified TCI. Type 1 may include a Joint DL/UL common TCI state to indicate a common beam for at least one DL channel and/or reference signal plus at least one UL channel and/or reference signal. Type 2 may include a separate DL common TCI state to indicate a common beam for more than one DL channel and/or reference signal. Type 3 may include a separate UL common TCI state to indicate a common beam for more than one UL channel and/or reference signal. Type 4 may include a separate DL single channel/reference signal TCI state to indicate a beam for a single DL channel and/or reference signal. Type 5 may include a separate UL single channel/reference signal TCI state to indicate a beam for a single UL channel and/or reference signal. Type 6 may include UL spatial relation info (e.g. an SRS resource indicator (SRI)) to indicate a beam for a single UL channel and/or reference signal. A source reference signal in unified TCIs may provide Quasi-co-location (QCL) information at least for at least one of PDSCH and PDCCH receptions in a serving cell, and a source reference signal in unified TCIs, if applicable, may provide a reference for determining common spatial transmit filter(s) for at least one of SRS, PUSCH and PUCCH transmissions in a serving cell.

The network may include a support mechanism for a UE to acknowledge successful decoding of a beam indication by using the acknowledgment/negative acknowledgment (ACK/NACK) of the PDSCH scheduled by the DCI carrying the beam indication as an ACK for the beam indication (e.g., TCI). However, in some cases, a DCI transmission may be used to indicate a TCI state without including a downlink assignment. For example, a DCI transmission having one of the formats listed above may be used to indicate TCI state but may not include any scheduling information for downlink data. Thus, an ACK/NACK for a PDSCH may not be available to be used for feedback for the beam indication. As a result, beam indications in DCI transmissions without downlink assignments may lead to unnecessary retransmissions due to a lack of feedback, which may increase network overhead and decrease network efficiency, thereby having a negative impact on network performance.

Some aspects of techniques and apparatuses described herein may facilitate providing feedback corresponding to unified TCI indications in DCI transmissions without downlink assignments. For example, in some aspects, a UE may receive, in a first slot, a DCI transmission that indicates a unified TCI, where the DCI transmission does not include a downlink assignment. The UE may transmit HARQ feedback corresponding to, and in response to, the unified TCI indication in the DCI. The HARQ feedback may include an ACK (as a confirmation) to indicate successful reception of the unified TCI in the DCI transmission or a NACK to indicate a failed reception of the unified TCI in the DCI transmission. The UE may transmit the HARQ feedback in a second slot determined based at least in part on a value of a slot parameter. In this manner, some aspects may facilitate avoidance of unnecessary retransmissions due to a lack of feedback, and may decrease network overhead and increase network efficiency, thereby having a positive impact on network performance.

Figure 3:
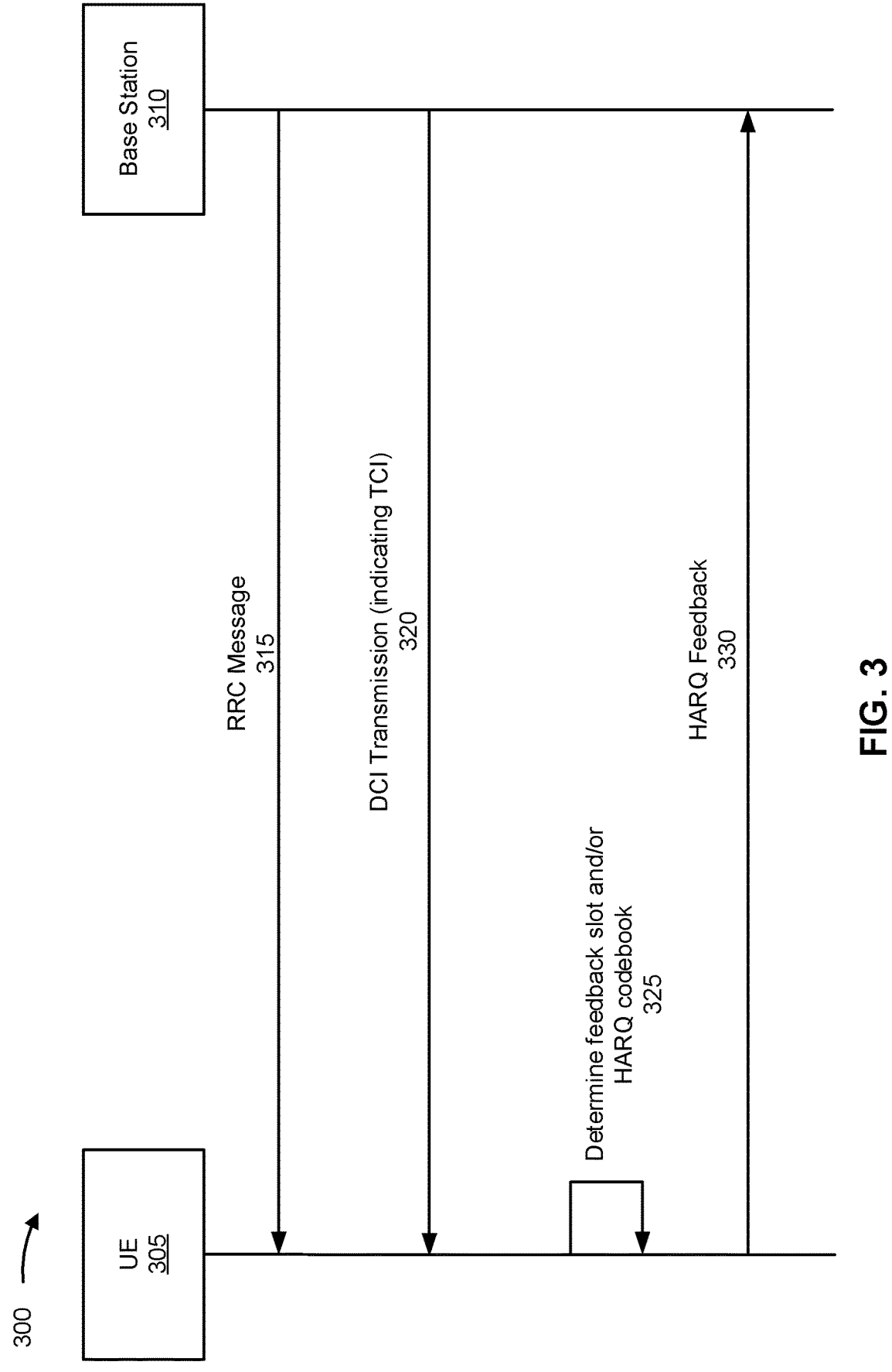
FIGS. 3-14 are diagrams illustrating examples associated with feedback corresponding to unified transmission configuration indications (TCIs) in downlink control information (DCI) without downlink assignments, in accordance with the present disclosure.

FIG. 3 is a diagram illustrating an example 300 associated with feedback corresponding to unified TCIs in DCI without downlink assignments, in accordance with the present disclosure. As shown, a UE 305 and a base station 310 may communicate with one another.

As shown by reference number 315, the base station 310 may transmit, and the UE 305 may receive, an RRC message. The RRC message may indicate one or more parameters that may be used by the UE 305 to determine a slot, a PUCCH resource and/or an ACK/NACK location in a HARQ codebook for transmitting HARQ feedback associated with, and in response to, a unified TCI indication in a DCI transmission not including a downlink assignment. For example, in some aspects, the RRC message may indicate a value of a slot parameter that may be used to determine the slot in which to transmit the HARQ feedback. In some aspects, the RRC message may include information from which the UE 305 may determine a PUCCH resource for transmitting the HARQ feedback. For example, in some aspects, the RRC message may indicate a PUCCH resource index configured by a parameter such as TCI-PUCCH. In some aspects, the RRC message may indicate an ACK/NACK location in a static HARQ-ACK codebook for the HARQ feedback (e.g., the first bit or last bit in the HARQ-ACK codebook). In some aspects, a predetermined PDSCH occasion may be associated with an ACK/NACK location in a static HARQ-ACK codebook for the HARQ feedback, and the RRC message may indicate that associated PDSCH occasion.

As shown by reference number 320, the base station 310 may transmit, and the UE 305 may receive, a DCI transmission that indicates a unified TCI. The DCI transmission may not include a downlink assignment. In some aspects, the DCI transmission may be validated as a DCI transmission with a TCI indication not including any downlink assignment, based at least in part on a configured scheduling radio network temporary identifier (CS-RNTI) that may be used to scramble the cyclic redundancy check (CRC) for the DCI transmission. The DCI transmission may be validated as a DCI transmission with a TCI indication not including any downlink assignment further based at least in part on certain values in certain fields. For example, the values of the following DCI fields for the DCI transmission with a TCI indication not including any downlink assignment may be set as follows: all ones in the redundancy version field, all ones in the modulation and coding scheme field, a zero in the new data indicator field, all zeros in the frequency domain resource allocation (FDRA) field if FDRA is configured as Type 0, all ones in the FDRA field if FDRA is configured as Type 1, and/or all zeroes in the FDRA field if FDRA is configured as dynamicSwitch, among other examples. In some aspects, the DCI transmission may have a DCI format 1_0, a DCI format 1_1, a DCI format 1_2, a DCI format 0_1, a DCI format 0_2, a DCI format 0_0, or a DCI format 2_x.

As shown by reference number 325, the UE 305 may determine one or more resources to be used to transmit HARQ feedback corresponding to the unified TCI in the DCI not including any downlink assignment. As shown by reference number 330, the UE 305 may transmit, and the base station 310 may receive, the HARQ feedback based at least in part on the determined resources. The HARQ feedback may include an ACK to indicate successful reception of the DCI transmission or a NACK to indicate a failed reception of the DCI transmission.

In some aspects, for example, the UE 305 may transmit the HARQ feedback corresponding to or in response to the unified TCI in the DCI not including any downlink assignment using a PUCCH transmission in a second slot that is separated from the first slot n where the UE 305 receives the DCI, by a number of slots indicated by a value of a slot parameter, k. That is, the second slot may be determined by n+k. The DCI format of the DCI transmission may include a PDSCH-to-HARQ feedback timing indicator field (e.g., for indicating a slot offset, k1) that indicates the value of the slot parameter k. The DCI format of the DCI transmission may include a PDSCH-to-HARQ feedback timing indicator field that indicates a slot offset k1 and a time domain resource assignment field that indicates a parameter k0. A sum of a value of the time domain resource assignment (TDRA) field and the PDSCH-to-HARQ feedback timing indicator field may indicate the value of the slot parameter: k=k0+k1. In some aspects, the RRC message may indicate the value of the slot parameter k. In some aspects, the value of the slot parameter k may be zero, and the second slot may include a last slot of the PUCCH transmission that overlaps with reception of the DCI transmission.

In some aspects, the UE 305 may transmit the HARQ feedback using a PUCCH resource having an index. The UE 305 may determine the PUCCH resource based at least in part on a PUCCH resource indicator field of the DCI transmission. In some aspects, the UE 305 may determine the PUCCH resource based at least in part on the RRC message.

The HARQ feedback transmitted by the UE 305 may include one ACK or NACK bit and may be transmitted using a HARQ-ACK codebook. For example, in some aspects, the UE 305 may transmit the HARQ feedback using a dynamic HARQ-ACK codebook (e.g., a Type II HARQ codebook). In some aspects, for example, the UE 305 may use the dynamic HARQ codebook based at least in part on receiving a RRC parameter value pdsch-HARQ-ACK-Codebook dynamic. The DCI format of the DCI transmission may include a downlink assignment index (DAI) field, and the UE 305 may determine an ACK/NCKlocation in the dynamic HARQ-ACK codebook for the HARQ feedback in response to the TCI indication in the DCI based at least in part on the DAI values indicated in the DCI. The DAI values may include a counter DAI value. In some aspects, the DAI values may include a counter DAI value and a total DAI value.

In some aspects, the UE 305 may transmit the HARQ feedback using a static HARQ-ACK codebook. For example, the ACK/NACK location may include a first bit of the static HARQ-ACK codebook. In some aspects, for example, the UE 305 may use the static HARQ codebook based at least in part on receiving a RRC parameter value pdsch-HARQ-ACK-Codebook semi-static. The DCI format of the DCI transmission may include a time domain resource assignment field that indicates a virtual PDSCH occasion. For example, in some aspects, the UE 305 may determine an ACK/NACK location in the static HARQ-ACK codebook for the HARQ feedback in response to the TCI indication in the DCI based at least in part on the virtual PDSCH occasion. In some aspects, the UE 305 may determine the location in the static HARQ-ACK codebook for the HARQ feedback based at least in part on an entry of a time domain allocation list that indicates the virtual PDSCH. In some aspects, the TDRA field may include a start and length indicator value (SLIV), and the UE 305 may determine a location in the static HARQ-ACK codebook for the HARQ feedback based at least in part on the SLIV.

As indicated above, the RRC message may indicate an ACK/NACK location, and the UE 305 may determine a location in the static HARQ-ACK codebook for the HARQ feedback based at least in part on the RRC message. In some aspects, the RRC message may indicate an associated PDSCH occasion, and the UE 305 may determine the location in the static HARQ-ACK codebook for the HARQ feedback based at least in part on the RRC message. In some aspects, the UE 305 may be based at least in part on an entry in time domain assignment list that indicates the PDSCH occasion.

In some aspects, the UE 305 may determine a location in the static HARQ-ACK codebook for the HARQ feedback based at least in part on a dedicated bit location in the static HARQ-ACK codebook. For example, the DCI transmission may indicate the dedicated bit location. In some aspects, if the DCI does not indicate the location, a NACK may be padded in the dedicated bit. In some aspects, the dedicated bit location may include a first bit of the static HARQ-ACK codebook or a last bit of the static HARQ-ACK codebook.

In some aspects, the UE 305 may append one or more dedicated bits to an end of the static HARQ-ACK codebook based at least in part on the DCI transmission. For example, in some aspects, the UE 305 may determine that the unified TCI includes an updated TCI and, based at least in part on that determination, the UE 305 may append one or more dedicated bits to the end of the static HARQ-ACK codebook.

In some aspects, similar techniques may be used for indicating HARQ feedback associated with a number of DCI transmissions. For example, the UE 305 may receive an additional DCI transmission that indicates an additional unified TCI that does not include a downlink assignment. In some aspects, the HARQ feedback may include a first ACK/NACK bit corresponding to the DCI transmission and a second ACK/NACK bit corresponding to the additional DCI transmission.

For example, the UE 305 may determine a first location of the first ACK/NACK bit based at least in part on at least one of a first ACK/NACK location associated with the first DCI transmission or a first PDSCH occasion associated with the first DCI transmission and may determine a second location of the second ACK/NACK bit based at least in part on at least one of a second ACK/NACK location associated with the second DCI transmission or a second PDSCH occasion associated with the second DCI transmission. In some aspects, the first DCI transmission may indicate the at least one of the first ACK/NACK location associated with the first DCI transmission or the first PDSCH occasion associated with the first DCI transmission, and the second DCI transmission may indicate the at least one of the second ACK/NACK location associated with the second DCI transmission or the second PDSCH occasion associated with the second DCI transmission.

In some aspects, the first DCI transmission may include a first TDRA field that indicates the at least one of the first ACK/NACK location, and the second DCI transmission may include a second TDRA field that indicates the at least one of the second ACK/NACK location. In some aspects, the first TDRA field may include a first SLIV that indicates the at least one of the first ACK/NACK location, and the second TDRA field may include a second SLIV that indicates the at least one of the second ACK/NACK location.

In some aspects, the UE 305 may determine the first location of the first ACK/NACK bit based at least in part on a mapping rule that maps a first ID of a first indication in the first DCI transmission with the at least one of the first ACK/NACK location associated with the first DCI transmission or the first PDSCH occasion associated with the first DCI transmission. For example, the first ID may include at least one of a first TCI codepoint, a first PDCCH monitoring occasion or a first HARQ ID field. The UE 305 may determine the location of the second ACK/NACK bit based at least in part on a mapping rule that maps a second ID of a second indication in the second DCI transmission with the at least one of the second ACK/NACK location associated with the second DCI transmission or the second PDSCH occasion associated with the second DCI transmission. The second ID may include at least one of a second TCI codepoint, a second PDCCH monitoring occasion or a second HARQ ID field.

In some aspects, the UE 305 may determine a first location of the first ACK/NACK bit based at least in part on a dedicated fixed-size location appended to an end of the static HARQ-ACK codebook and may determine a second location of the first ACK/NACK bit based at least in part on the dedicated fixed-size location appended to an end of the static HARQ-ACK codebook. The dedicated fixed-size location may include a number of bits that is greater than a number of received DCI transmissions indicating unified TCIs and without downlink assignments. In some aspects, the UE 305 may determine a first location of the first ACK/NACK bit based at least in part on a dynamic location appended to an end of the static HARQ-ACK codebook and may determine a second location of the first ACK/NACK bit based at least in part on the dynamic location appended to an end of the static HARQ-ACK codebook.

In some aspects, the UE 305 may receive the DCI transmission associated with a PDSCH occasion and may receive a PDSCH transmission associated with the PDSCH occasion. The UE 305 may transmit the HARQ feedback based at least in part on a rule. In some aspects, the UE 305 may transmit the HARQ feedback based at least in part on increasing a size of a HARQ-ACK codebook used for transmitting the HARQ feedback. The UE 305 may append an ACK/NACK bit corresponding to the DCI transmission to an end of the HARQ-ACK codebook. In some aspects, the UE 305 may append an ACK/NACK bit corresponding to the DCI transmission adjacent an ACK/NACK bit corresponding to the PDSCH transmission in the HARQ-ACK codebook.

As indicated above, FIG. 3 is provided as an example. Other examples may differ from what is described with regard to FIG. 3.

Figure 4:
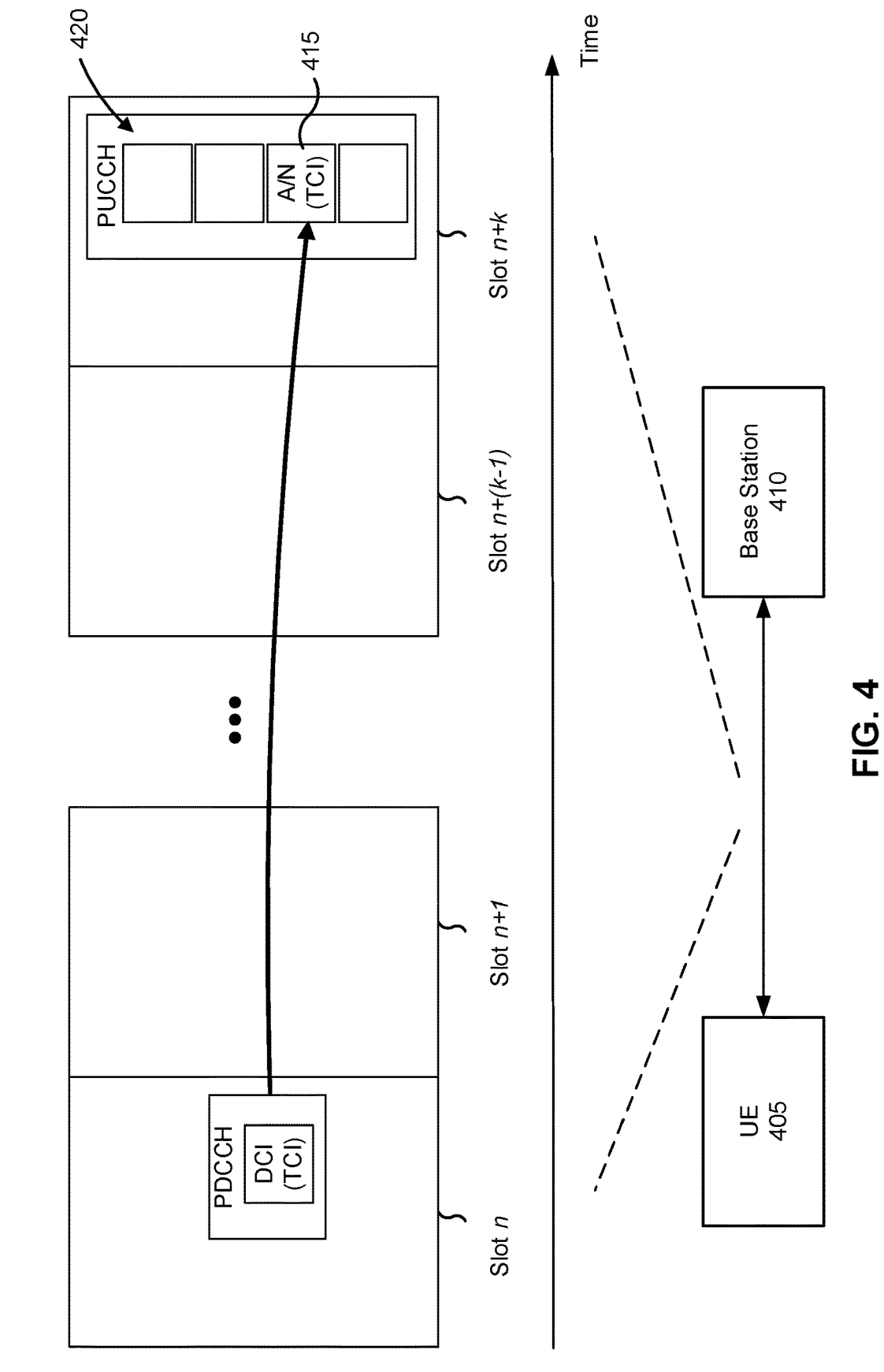

FIG. 4 is a diagram illustrating an example 400 associated with feedback corresponding to unified TCIs in DCI without downlink assignments, in accordance with the present disclosure. As shown, a UE 405 and a base station 410 may communicate with one another. In some aspects, the UE 405 may be, or be similar to, the UE 305 shown in FIG. 3. The base station 410 may be, or be similar to, the base station 310 shown in FIG. 3.

As shown, the UE 405 may receive, from the base station 410, a DCI transmission that indicates a unified TCI (shown as "DCI (TCI)") associated with a physical downlink control channel (PDCCH) in a slot n. The UE 405 may transmit HARQ feedback that indicates an ACK or a NACK (shown as "A/N") using one or more PUCCH resources 415 of a set 420 of PUCCH resources in a slot n+k. The slot n+k and/or the one or more PUCCH resources 415 may be determined as described above, in connection with FIG. 3.

For example, in some aspects, the DCI transmission for beam indication (e.g., a unified TCI indication) without downlink assignment may include a DCI format 1_1 or 1_2. Upon a successful reception of the beam indication DCI, the UE 405 may report an ACK to the base station, and upon a failed reception of the beam indication DCI, the UE 405 may report a NACK to the base station.

The one or more PUCCH resources 415 may be used to transmit a HARQ-ACK codebook of multiple ACK/NACK bits, including at least one of the ACK/NACK bit for the HARQ feedback corresponding the beam indication in the DCI without any downlink assignment. The HARQ-ACK codebook may be configured as a type 1 HARQ-ACK codebook (e.g., by an RRC parameter pdsch-HARQ-ACK-Codebook static) or a type 2 HARQ-ACK codebook (e.g., by an RRC parameter pdsch-HARQ-ACK-Codebook dynamic). In some aspects, for example, for type-1 HARQ-ACK codebook, the ACK/NACK location in a HARQ-ACK codebook for an ACK/NACK information in response to a beam indication in a DCI without any downlink assignment may be determined based on the virtual PDSCH occasion indicated by the TDRA field in the DCI, and based on the time domain assignment list configured for PDSCH. For example, the time domain assignment list may be based on RRC configuration pdsch-TimeDomainAllocationList. A virtual PDSCH occasion provides only a reference or an index to identify a PDSCH occasion among multiple candidate PDSCH occasions configured by RRC message, and the UE does not receive signal in a virtual PDSCH occasion.

In some other aspects, for type-1 HARQ-ACK codebook, the UE 405 may determine an ACK/NACK location in the HARQ-ACK codebook for the ACK/NACK information in response to the beam indication in the DCI without any downlink assignment based at least in part on the virtual PDSCH occasion jointly identified by multiple indications:

1) if present, the TDRA field in the DCI; otherwise, the TDRA indication configured in a RRC message pdsch-TimeDomainAllocationList;
2) if present, the PDSCH-to-HARQ_feedback timing indicator field in the DCI, otherwise, dl-DataToUL-ACK (or dl-DataToUL-ACK-ForDCI-Format1-2-r16) in a RRC message;
3) a DL slots index associated with the DCI or virtual PDSCH if one uplink slot overlaps with multiple downlink slots based on the numerology of downlink and uplink in the serving cell.

In some aspects, for type-2 HARQ-ACK codebook, the UE 405 may determine an ACK/NACK location in the HARQ-ACK codebook for the ACK/NACK information in response to the beam indication in the DCI without any downlink assignment based at least in part on the DAI field in the DCI. In some aspects, for type-2 HARQ-ACK codebook, an ACK/NACK location in the HARQ-ACK codebook for the ACK/NACK information in response to the beam indication in the DCI without any downlink assignment may be determined based on the same rule as determining an ACK/NACK location in the HARQ-ACK codebook for the ACK information in the HARQ-ACK codebook in response to a semi-persistent scheduling (SPS) release DCI.

In some aspects, the ACK/NACK information in response to the beam indication in the DCI may be transmitted in a PUCCH k slots after the end of the PDCCH reception for the DCI where k is indicated by the PDSCH-to-HARQ_feedback timing indicator field in the DCI format, or provided dl-DataToUL-ACK (or dl-DataToUL-ACK-ForDCI-Format1-2-r16) if the PDSCH-to-HARQ_feedback timing indicator field is not present in the DCI.

In some aspects, for type-2 HARQ-ACK codebook, a UE 405 may report the HARQ-ACK information for a beam indication in a DCI only in a HARQ-ACK codebook that the UE transmits in a slot indicated by a value of a PDSCH-to-HARQ_feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1.

As indicated above, FIG. 4 is provided as an example. Other examples may differ from what is described with regard to FIG. 4.

Figure 5:
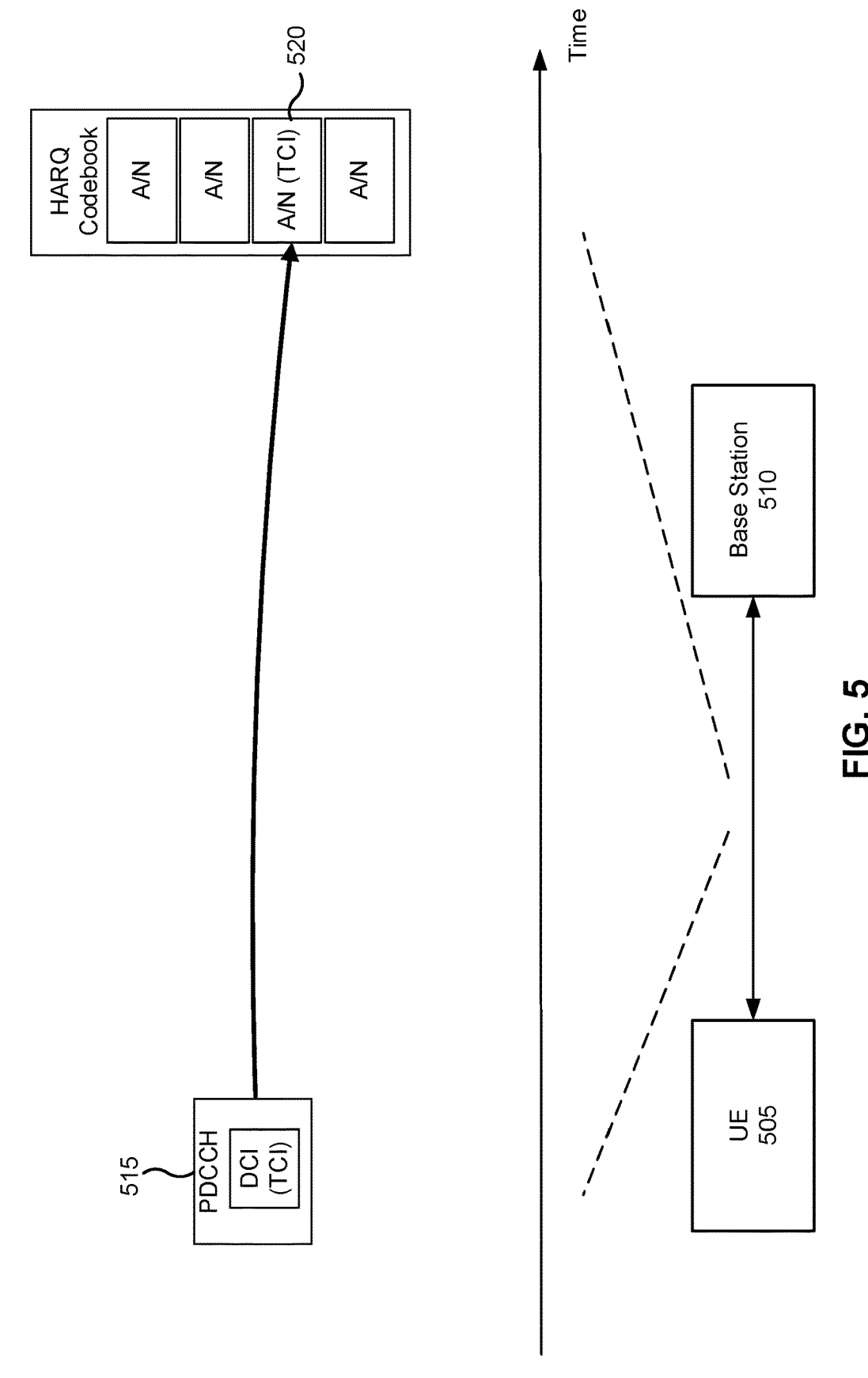

FIG. 5 is a diagram illustrating an example 500 associated with feedback corresponding to unified TCIs in DCI without downlink assignments, in accordance with the present disclosure. As shown, a UE 505 and a base station 510 may communicate with one another. In some aspects, the UE 505 may be, or be similar to, the UE 305 shown in FIG. 3. The base station 510 may be, or be similar to, the base station 310 shown in FIG. 3.

As shown, the UE 505 may receive, from the base station 510, a DCI transmission that indicates a unified TCI (shown as "DCI (TCI)") associated with a PDCCH 515. The UE 505 may transmit HARQ feedback that indicates an ACK or a NACK corresponding to the TCI (shown as "A/N (TCI)") using a location 520 in a HARQ-ACK codebook (shown as "HARQ codebook"). For example, the location 520 may be determined based on a counter DAI (C-DAI) indicated in the DCI without downlink assignment. In an example, the DCI (TCI) may indicate a value of 1 corresponding to the C-DAI. The location 520 may correspond to C-DAI=1.

As indicated above, FIG. 5 is provided as an example. Other examples may differ from what is described with regard to FIG. 5.

Figure 6:
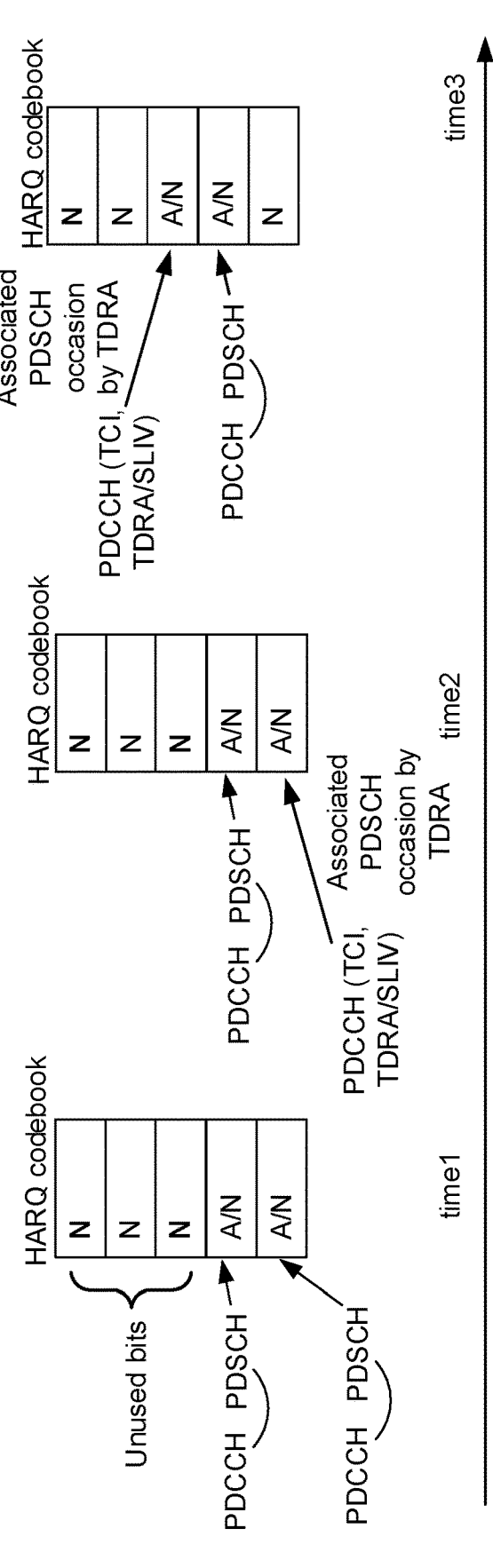

FIG. 6 is a diagram illustrating an example 600 associated with feedback corresponding to unified TCIs in DCI without downlink assignments, in accordance with the present disclosure. Example 600 illustrates use of a static HARQ-ACK codebook (e.g., a Type I HARQ-ACK codebook) according to some aspects.

In some aspects, if a UE receives a unified TCI indicated by a DCI without any downlink assignment and is provided with pdsch-HARQ-ACK-Codebook semi-static, the UE may generate one A/N bit in the Type I HARQ codebook for the DCI, and the location of A/N bit in the HARQ codebook in response to the TCI indication in the DCI is the same as the one for the PDSCH occasion indicated with the TDRA field with the DCI. In some aspects, the UE may determine the location of A/N bit in the HARQ codebook in response to the TCI indication in the DCI based on the assumption that the PDSCH occasion is located in the same slot as the DCI. In some aspects, the UE may expect that the indicated TDRA of the DCI corresponds to an A/N bit in the HARQ codebook.

As shown in FIG. 6, for example, at a time 1, the UE may transmit a HARQ codebook that includes an A/N bit associated with a first PDCCH (e.g., DCI transmission) that schedules a PDSCH and a second A/N bit associated with a second PDCCH that schedules a second PDSCH. As shown, unused bits may be padded with NACKs (shown as "N"). At a time 2, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a location corresponding to an associated PDSCH that may be determined based at least in part on a TDRA and/or SLIV in the DCI. At a time 3, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a dedicated location corresponding to a different associated PDSCH that may be determined based at least in part on a TDRA and/or SLIV.

As indicated above, FIG. 6 is provided as an example. Other examples may differ from what is described with regard to FIG. 6.

Figure 7:
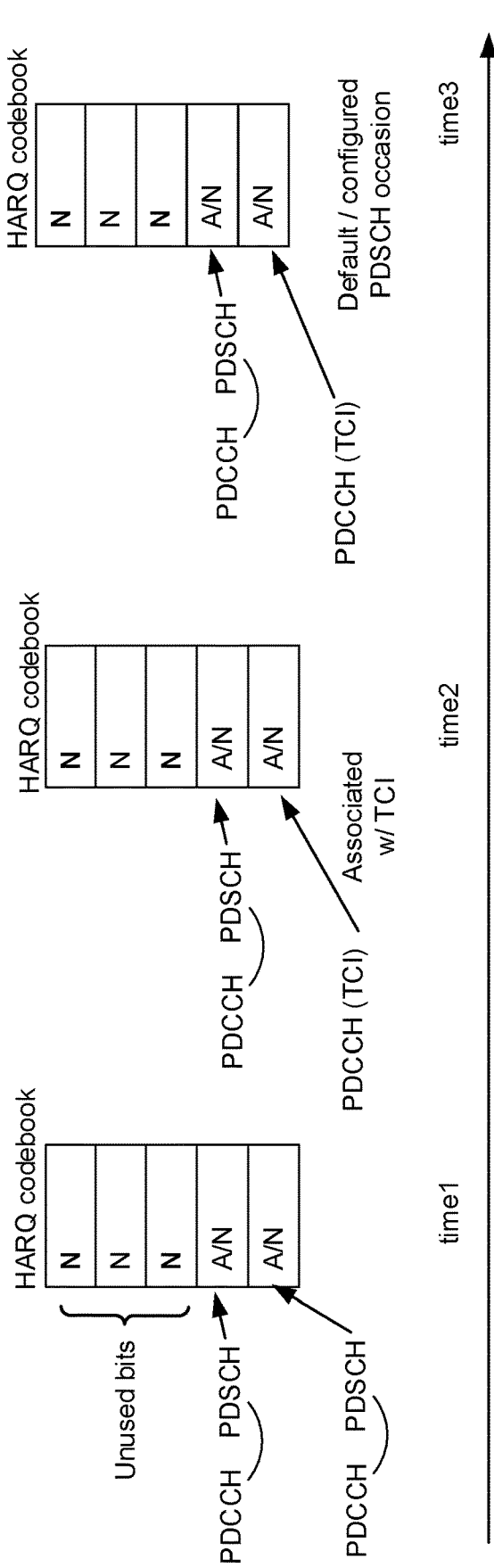

FIG. 7 is a diagram illustrating an example 700 associated with feedback corresponding to unified TCIs in DCI without downlink assignments, in accordance with the present disclosure. Example 700 illustrates use of a static HARQ-ACK codebook (e.g., a Type I HARQ-ACK codebook) according to some aspects.

In some aspects, if a UE receives a unified TCI indicated by a DCI without any downlink assignment and is provided with pdsch-HARQ-ACK-Codebook semi-static, the UE may generate one A/N bit in the Type I HARQ codebook for the DCI, and the location of A/N for the DCI is the same as for the PDSCH occasion configured associated with the unified TCI indication DCI without any downlink assignment.

For example, as shown in FIG. 7, at a time 1, the UE may transmit a HARQ codebook that includes an A/N bit associated with a first PDCCH that schedules a PDSCH and a second A/N bit associated with a second PDCCH that schedules a second PDSCH. As shown, unused bits may be padded with NACKs (shown as "N"). At a time 2, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a location associated with the PDCCH (TCI). At a time 3, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a dedicated location corresponding to an associated configured PDSCH occasion by RRC configuration or that is a default location (e.g., $1^{st}$ A/N bit in the HARQ codebook, or associated with the PDSCH occasion identified by the $1^{st}$ entry in the pdsch-TimeDomainAllocationList).

As indicated above, FIG. 7 is provided as an example. Other examples may differ from what is described with regard to FIG. 7.

Figure 8:
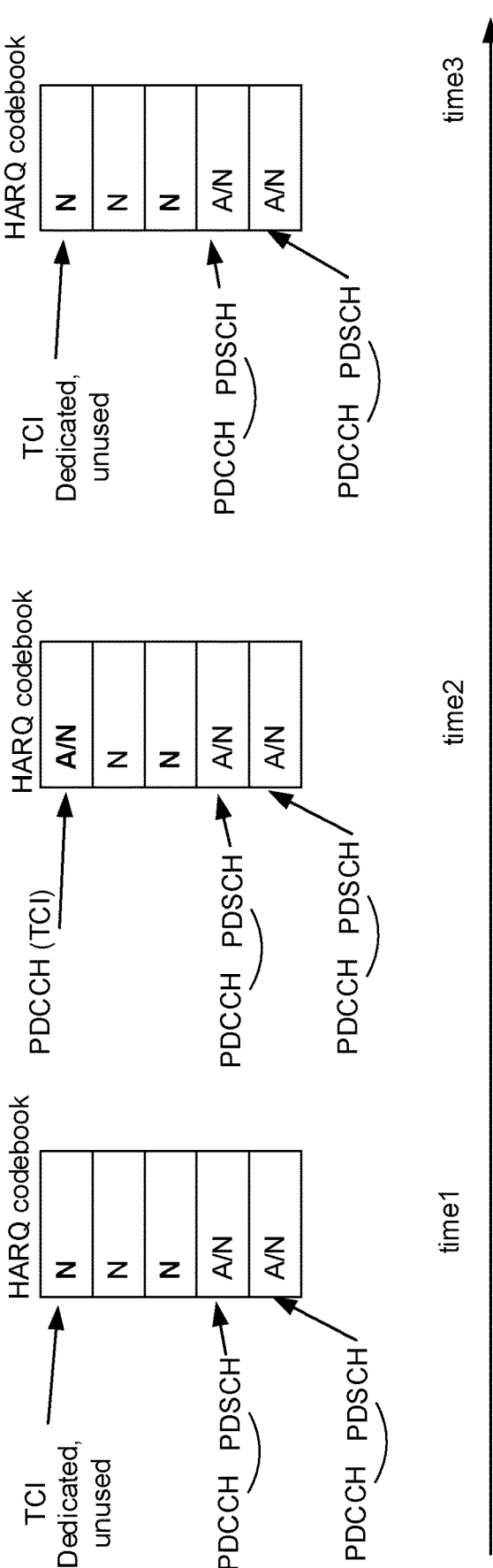

FIG. 8 is a diagram illustrating an example 800 associated with feedback corresponding to unified TCIs in DCI without downlink assignments, in accordance with the present disclosure. Example 800 illustrates use of a static HARQ-ACK codebook (e.g., a Type I HARQ-ACK codebook) in which the codebook size is fixed.

In some aspects, if a UE receives a unified TCI indicated by a DCI without any downlink assignment and is provided with pdsch-HARQ-ACK-Codebook=semi-static, the UE may generate one A/N bit in the Type I HARQ codebook for the DCI, and the location of the A/N is the bit appended after the HARQ-ACK information for PDSCH receptions. In some aspects, the UE may append a NACK if no DCI is received for unified TCI indication without any DL assignment. In some aspects, the UE will not append a NACK bit if no DCI is received for unified TCI indication without any DL assignment.

In some aspects, the location of the A/N may be the first bit in the codebook, as shown in FIG. 8. For example, as shown, at a time 1, the UE may transmit a HARQ codebook that includes an A/N bit associated with a first PDCCH that schedules a PDSCH and a second A/N bit associated with a second PDCCH that schedules a second PDSCH. As shown, unused TCI dedicated bits may be padded with NACKs (shown as "N"). At a time 2, the UE may transmit a HARQ codebook that includes two A/N bits associated with respective PDCCHs that schedule PDSCHs and an A/N bit associated with a PDCCH that indicates a TCI without including a downlink assignment. The A/N bit corresponding to the TCI may be included in a default location such as, for example, in a first bit of the codebook. At a time 3, the UE may transmit a HARQ codebook that includes two A/N bits associated with respective PDCCHs that schedule PDSCHs.

As indicated above, FIG. 8 is provided as an example. Other examples may differ from what is described with regard to FIG. 8.

Figure 9:
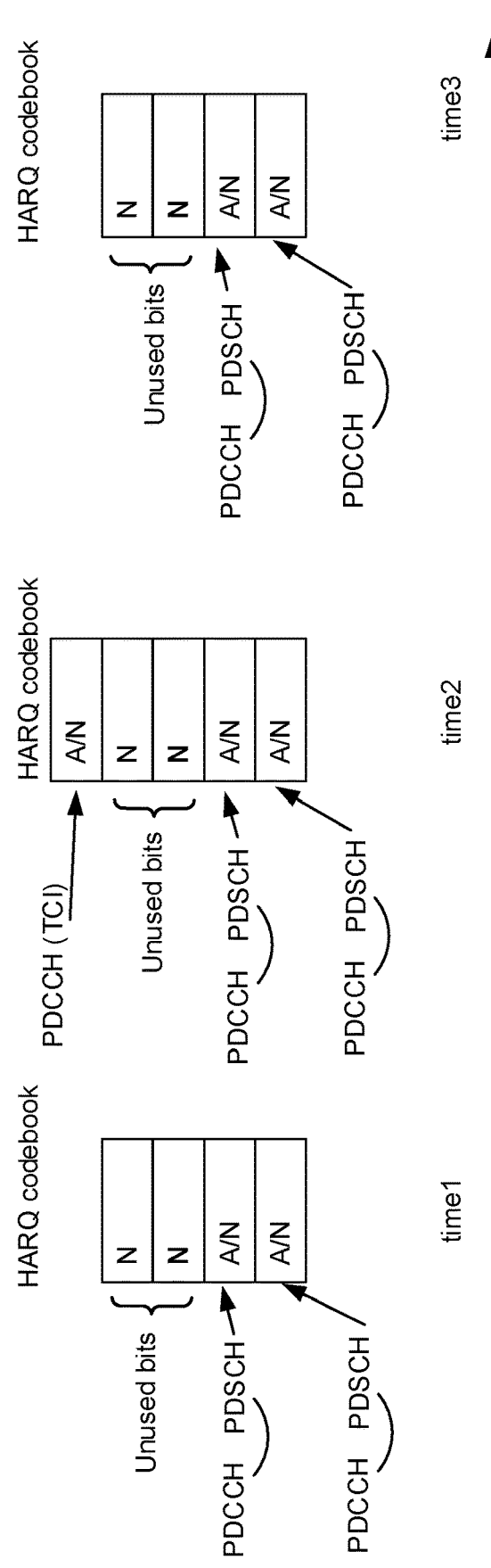

FIG. 9 is a diagram illustrating an example 900 associated with feedback corresponding to unified TCIs in DCI without downlink assignments, in accordance with the present disclosure. Example 900 illustrates use of a static HARQ-ACK codebook (e.g., a Type I HARQ-ACK codebook) in which the codebook size may vary.

For example, as shown, at a time 1, the UE may transmit a HARQ codebook that includes an A/N bit associated with a first PDCCH that schedules a PDSCH and a second A/N bit associated with a second PDCCH that schedules a second PDSCH. As shown, unused TCI dedicated bits may be padded with NACKs (shown as "N"). At a time 2, the UE may transmit a HARQ codebook that includes two A/N bits associated with respective PDCCHs that schedule PDSCHs and an appended A/N bit associated with a PDCCH that indicates a TCI without including a downlink assignment. The A/N bit corresponding to the TCI may be appended as a first bit of the codebook. At a time 3, the UE may transmit a HARQ codebook that includes two A/N bits associated with respective PDCCHs that schedule PDSCHs.

As indicated above, FIG. 9 is provided as an example. Other examples may differ from what is described with regard to FIG. 9.

Figure 10:
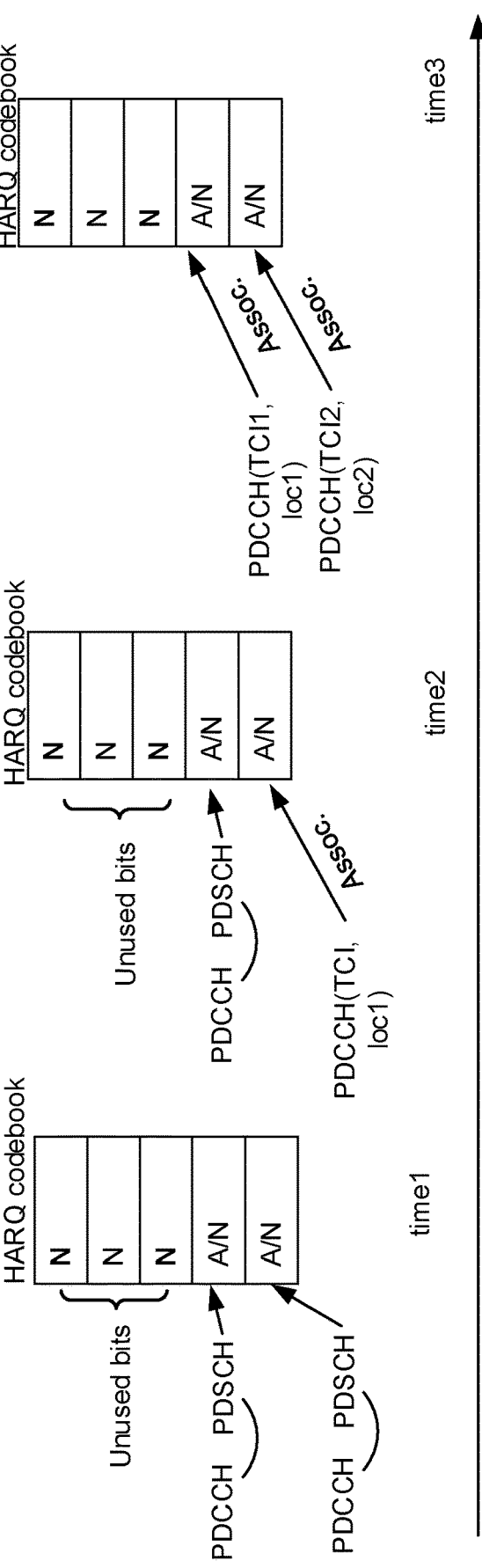

FIG. 10 is a diagram illustrating an example 1000 associated with feedback corresponding to unified TCIs in DCI without downlink assignments, in accordance with the present disclosure. Example 1000 illustrates use of a static HARQ-ACK codebook (e.g., a Type I HARQ-ACK codebook) in which the codebook size is fixed.

In some aspects, if a UE receives multiple unified TCI indicated by DCIs without any downlink assignment and is provided with pdsch-HARQ-ACK-Codebook semi-static, the UE may generate one A/N bit in the Type I HARQ codebook in response to each DCI, and the location of A/N for the DCI is determined based on the PDSCH occasion identified by the TDRA field in the DCI. In some aspects, the UE may expect that the indicated TDRA of the DCI corresponds to an A/N in the HARQ codebook.

For example, as shown in FIG. 10, at a time 1, the UE may transmit a HARQ codebook that includes an A/N bit associated with a first PDCCH that schedules a PDSCH and a second A/N bit associated with a second PDCCH that schedules a second PDSCH. As shown, unused bits may be padded with NACKs (shown as "N"). At a time 2, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a location associated with the PDCCH (TCI). At a time 3, the UE may transmit a HARQ codebook that includes a first A/N bit in a first location (shown as "loc1") associated with a first PDCCH that indicates a TCI (shown as PDCCH (TCI1)) without including a downlink assignment and a second A/N bit associated with a second PDCCH that indicates a TCI (shown as PDCCH (TCI2)) without including a downlink assignment. The A/N bits corresponding to the TCIs may be included in respective locations associated with the PDCCHs.

As indicated above, FIG. 10 is provided as an example. Other examples may differ from what is described with regard to FIG. 10.

Figure 11:
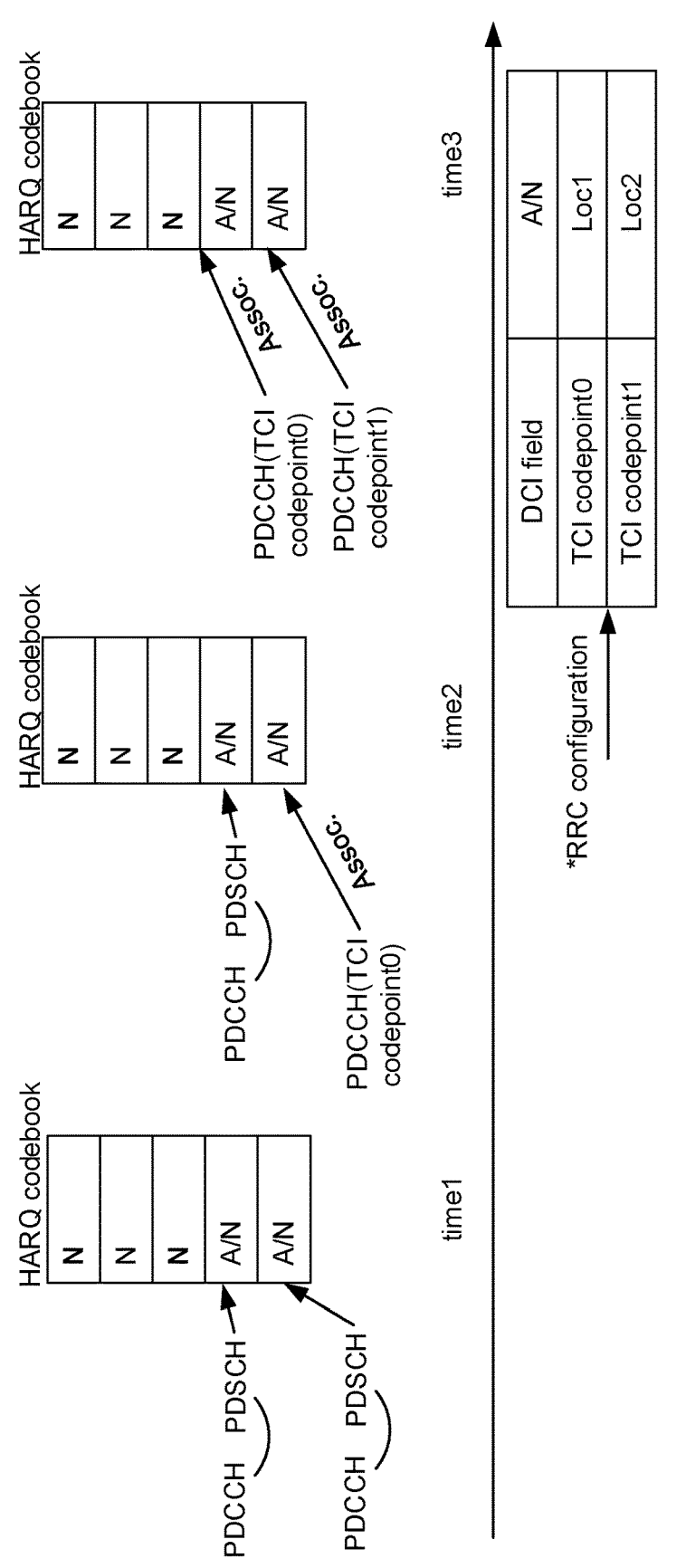

FIG. 11 is a diagram illustrating an example 1100 associated with feedback corresponding to unified TCIs in DCI without downlink assignments, in accordance with the present disclosure. Example 1100 illustrates use of a static HARQ-ACK codebook (e.g., a Type I HARQ-ACK codebook) in which the codebook size is fixed.

In some aspects, if a UE receives multiple unified TCI indicated by DCIs without any downlink assignment and is provided with pdsch-HARQ-ACK-Codebook semi-static, the UE may generate one A/N bit in the Type I HARQ codebook for each DCI, and the location of A/N for each DCI is the same as for the PDSCH occasion configured associated with the unified TCI indication. The location may be indicated using an RRC configuration that may map an ID to a location.

For example, as shown in FIG. 11, at a time 1, the UE may transmit a HARQ codebook that includes an A/N bit associated with a first PDCCH that schedules a PDSCH and a second A/N bit associated with a second PDCCH that schedules a second PDSCH. As shown, unused bits may be padded with NACKs (shown as "N"). At a time 2, the UE may transmit a HARQ codebook that includes an A/N bit associated with a PDCCH that schedules a PDSCH and an A/N bit associated with a PDCCH that indicates a TCI without including a downlink assignment. The A/N bit corresponding to the TCI may be included in a first location associated with the PDCCH (TCI) based on a mapping that maps a first TCI codepoint (shown as "TCI codepoint0") to the first location (shown as "Loc1"). At a time 3, the UE may transmit a HARQ codebook that includes a first A/N bit in a first location (shown as "Loc1") associated with a first PDCCH that indicates a TCI (shown as PDCCH (TCI1)) without including a downlink assignment and a second A/N bit in a second location (shown as "Loc2") associated with a second PDCCH that indicates a TCI (shown as PDCCH (TCI2)) without including a downlink assignment. The second location associated with the PDCCH (TCI) may be based on the mapping that maps a second TCI codepoint (shown as "TCI codepoint1") to the second location (shown as "Loc2").

In some aspects, the mapping between multiple ACK/NACK information in response to multiple DCIs with TCI indication not including any downlink assignment and multiple configured or default locations in HARQ codebook may be predetermined by default order or RRC configured order. For example, the ACK/NACK information in response to a DCI with a TCI indication using a first TCI codepoint may be mapped to the first default location of HARQ codebook, the ACK/NACK information in response to a DCI with a TCI indication using a second TCI codepoint is mapped to the second default location of HARQ codebook. In some other aspects, the HARQ ID field in the DCI with TCI indication not including any downlink assignment may be used to determine an ACK/NACK location in the HARQ codebook. For example, the ACK/NACK information in response to a DCI with a TCI indication using a first HARQ ID is mapped to the first default location of HARQ codebook, the ACK/NACK information in response to a DCI with a TCI indication using a second HARQ ID is mapped to the second default location of HARQ codebook. In some other aspects, the PDCCH monitoring occasion index having the DCI with TCI indication not including any downlink assignment may be used to determine an ACK/NACK location in the HARQ codebook. For example, the ACK/NACK information in response to a DCI with a TCI indication in a first PDCCH monitoring occasion index may be mapped to the first default location of HARQ codebook, the ACK/NACK information in response to a DCI with a TCI indication in a second PDCCH monitoring occasion index may be mapped to the second default location of HARQ codebook.

As indicated above, FIG. 11 is provided as an example. Other examples may differ from what is described with regard to FIG. 11.

Figure 12:
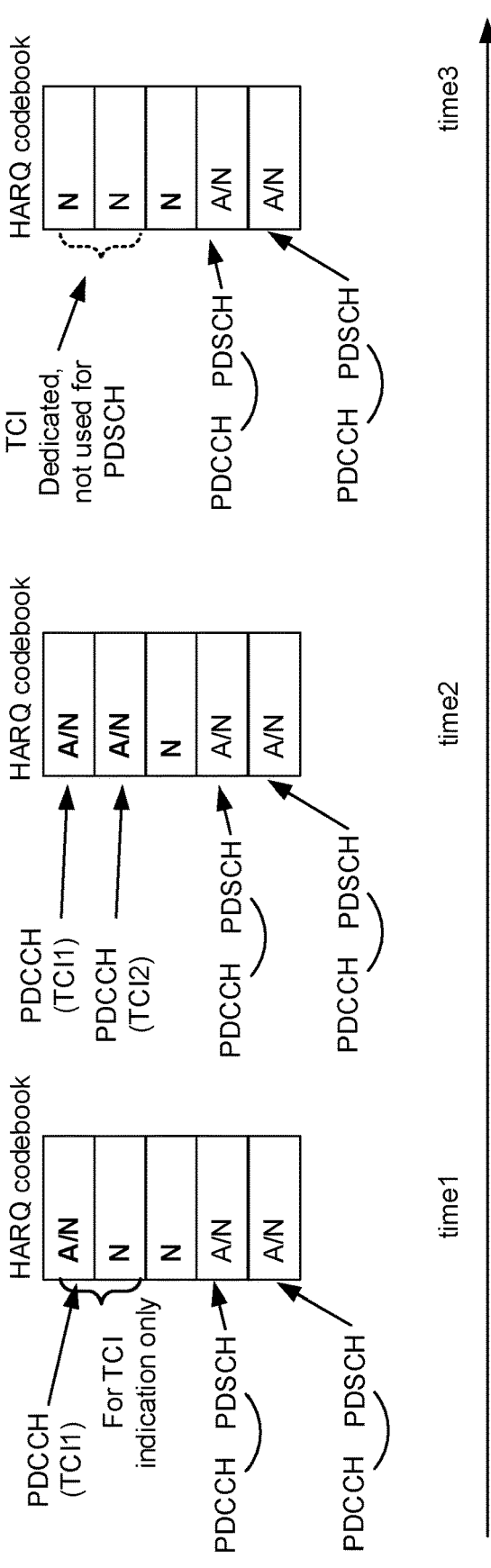

FIG. 12 is a diagram illustrating an example 1200 associated with feedback corresponding to unified TCIs in DCI without downlink assignments, in accordance with the present disclosure. Example 1200 illustrates use of a static HARQ-ACK codebook (e.g., a Type I HARQ-ACK codebook) in which the codebook size is fixed.

In some aspects, if a UE receives multiple unified TCIs indicated by multiple DCIs without any downlink assignment and is provided with pdsch-HARQ-ACK-Codebook=semi-static, the UE may generate one A/N bit in the Type I HARQ codebook for each DCI, and the location of multiple A/Ns is the fixed number of multiple bits appended after the HARQ-ACK information for PDSCH receptions. The UE may append a NACK if one DCI for unified TCI indication without any DL assignment is not received. In some aspects, the fixed number of bits may be appended as the first bits in the codebook.

For example, as shown, at a time 1, the UE may transmit a HARQ codebook that includes an A/N bit associated with a first PDCCH that schedules a PDSCH and a second A/N bit associated with a second PDCCH that schedules a second PDSCH. The codebook also may include an A/N associated with a first PDCCH that indicates a TCI (shown as PDCCH (TCI1)) in a dedicated appended bit. As shown, unused TCI dedicated bits may be padded with NACKs (shown as "N"). At a time 2, the UE may transmit a HARQ codebook that includes two A/N bits associated with respective PDCCHs that schedule PDSCHs and two A/N bits associated with two respective PDCCHs that indicate TCIs without including a downlink assignment (shown as PDCCH (TCI1) and PDCCH (TCI2)). At a time 3, the UE may transmit a HARQ codebook that includes two A/N bits associated with respective PDCCHs that schedule PDSCHs and may include Ns in unused bits.

As indicated above, FIG. 12 is provided as an example. Other examples may differ from what is described with regard to FIG. 12.

Figure 13:
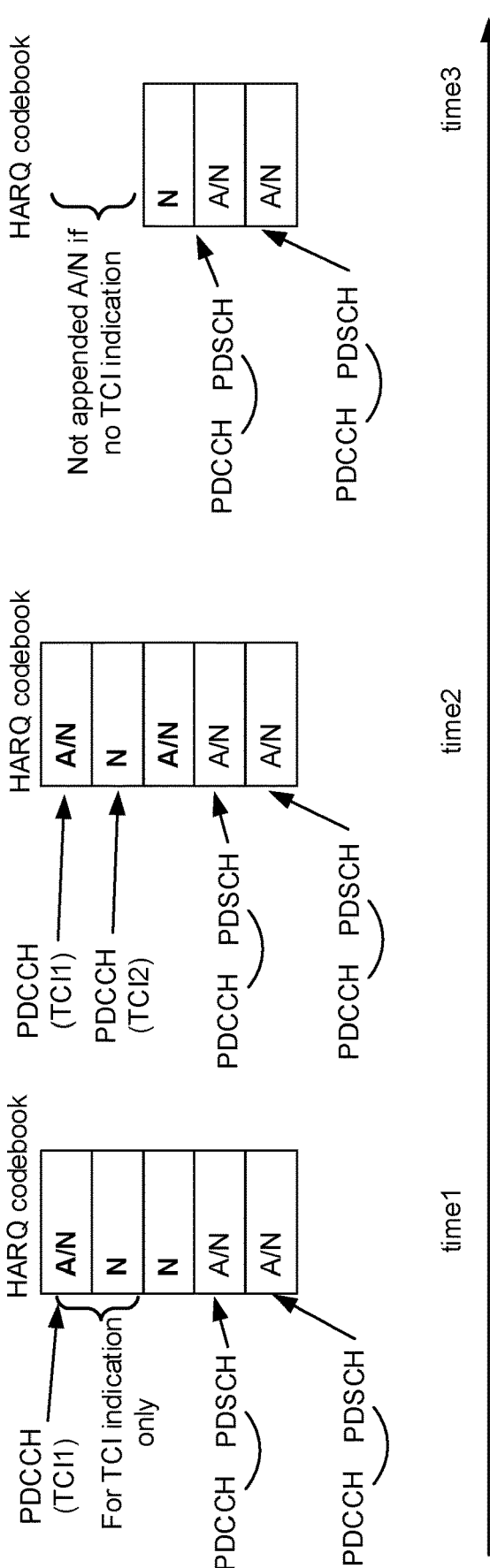

FIG. 13 is a diagram illustrating an example 1300 associated with feedback corresponding to unified TCIs in DCI without downlink assignments, in accordance with the present disclosure. Example 1300 illustrates use of a static HARQ-ACK codebook (e.g., a Type I HARQ-ACK codebook) in which the codebook size may vary.

In some aspects, the UE may not append any bit if none of DCI for unified TCI indication without any DL assignment is received. For example, as shown, at a time 1, the UE may transmit a HARQ codebook that includes an A/N bit associated with a first PDCCH that schedules a PDSCH and a second A/N bit associated with a second PDCCH that schedules a second PDSCH. The codebook also may include an A/N associated with a first PDCCH that indicates a TCI (shown as PDCCH (TCI1)) in a dedicated appended bit. As shown, unused TCI dedicated bits may be padded with NACKs (shown as "N"). At a time 2, the UE may transmit a HARQ codebook that includes two A/N bits associated with respective PDCCHs that schedule PDSCHs and two A/N bits associated with two respective PDCCHs that indicate TCIs without including a downlink assignment (shown as PDCCH (TCI1) and PDCCH (TCI2)). At a time 3, the UE may transmit a HARQ codebook that includes two A/N bits associated with respective PDCCHs that schedule PDSCHs. As shown, the codebook may have no appended A/N bits if no PDCCHs with TCIs are received.

As indicated above, FIG. 13 is provided as an example. Other examples may differ from what is described with regard to FIG. 13.

Figure 14:
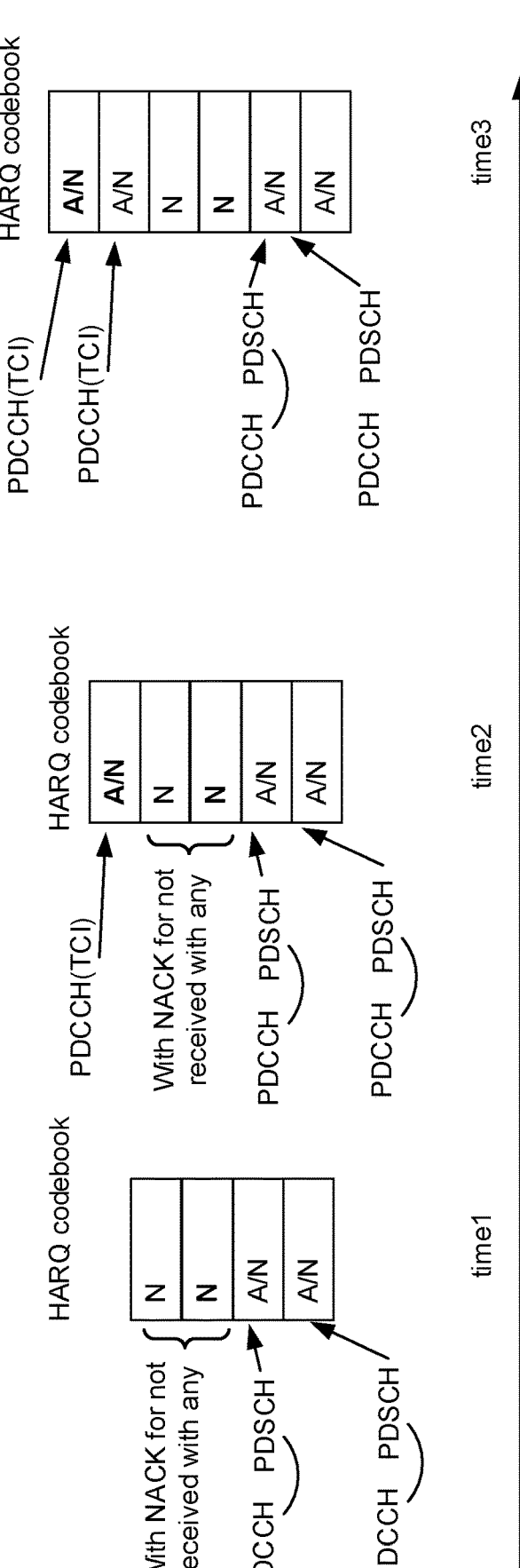

FIG. 14 is a diagram illustrating an example 1400 associated with feedback corresponding to unified TCIs in DCI without downlink assignments, in accordance with the present disclosure. Example 1400 illustrates use of a static HARQ-ACK codebook (e.g., a Type I HARQ-ACK codebook) in which the codebook size may vary.

In some aspects, if a UE receives multiple unified TCI indicated by multiple DCIs without any downlink assignment and is provided with pdsch-HARQ-ACK-Codebook semi-static, the UE may generate one A/N bit in the Type I HARQ codebook for the DCI, and the location of A/N is the bit appended after the HARQ-ACK information for PDSCH receptions. In some aspects, the UE may not append a NACK if the DCI for unified TCI indication without any DL assignment is not received.

In some aspects, the location of the appended A/N bits may be at the beginning of the codebook. For example, as shown in FIG. 14, at a time 1, the UE may transmit a HARQ codebook that includes an A/N bit associated with a first PDCCH that schedules a PDSCH and a second A/N bit associated with a second PDCCH that schedules a second PDSCH. At a time 2, the UE may transmit a codebook that also may include an A/N associated with a first PDCCH that indicates a TCI (shown as PDCCH (TCI1)) in an appended bit. As shown, unused TCI dedicated bits may be padded with NACKs (shown as "N"). At a time 3, the UE may transmit a HARQ codebook that includes two A/N bits associated with respective PDCCHs that schedule PDSCHs and two appended A/N bits associated with two respective PDCCHs that indicate TCIs without including a downlink assignment (shown as PDCCH (TCI1) and PDCCH (TCI2)).

As indicated above, FIG. 14 is provided as an example. Other examples may differ from what is described with regard to FIG. 14.

FIG. 15 is a diagram illustrating an example process 1500 performed, for example, by a UE, in accordance with the present disclosure. Example process 1500 is an example where the UE (e.g., UE 305) performs operations associated with feedback corresponding to unified TCIs in DCI without downlink assignments.

As shown in FIG. 15, in some aspects, process 1500 may include receiving, in a first slot, a DCI transmission that indicates a unified TCI, wherein the DCI transmission does not include a downlink assignment (block 1510). For example, the UE (e.g., using reception component 1702, depicted in FIG. 17) may receive, in a first slot, a DCI transmission that indicates a unified TCI, wherein the DCI transmission does not include a downlink assignment, as described above.

As further shown in FIG. 15, in some aspects, process 1500 may include transmitting HARQ feedback corresponding to the unified TCI, wherein the HARQ feedback comprises an ACK to indicate successful reception of the unified TCI in the DCI transmission or a NACK to indicate a failed reception of the unified TCI in the DCI transmission (block 1520). For example, the UE (e.g., using transmission component 1704, depicted in FIG. 17) may transmit HARQ feedback corresponding to the unified TCI, wherein the HARQ feedback comprises an ACK to indicate successful reception of the unified TCI in the DCI transmission or a NACK to indicate a failed reception of the unified TCI in the DCI transmission, as described above.

Process 1500 may include additional aspects, such as any single aspect or any combination of aspects described below and/or in connection with one or more other processes described elsewhere herein.

In a first aspect, transmitting the HARQ feedback comprises transmitting the HARQ feedback using a PUCCH transmission in a second slot, wherein the second slot is separated from the first slot by a number of slots indicated by a value of a slot parameter.

In a second aspect, alone or in combination with the first aspect, the DCI transmission comprises a PDSCH-to-HARQ feedback timing indicator field, and wherein the PDSCH-to-HARQ feedback timing indicator field indicates the value of the slot parameter.

In a third aspect, alone or in combination with one or more of the first and second aspects, the DCI transmission comprises a PDSCH-to-HARQ feedback timing indicator field and a time domain resource assignment (TDRA) field, and wherein a sum of a value of the TDRA field and the PDSCH-to-HARQ feedback timing indicator field indicates the value of the slot parameter.

In a fourth aspect, alone or in combination with one or more of the first through third aspects, process 1500 includes receiving a radio resource control message that indicates the value of the slot parameter.

In a fifth aspect, alone or in combination with one or more of the first through fourth aspects, the value of the slot parameter is zero, and wherein the second slot comprises a last slot of the PUCCH transmission that overlaps with reception of the DCI transmission.

In a sixth aspect, alone or in combination with one or more of the first through fifth aspects, transmitting the HARQ feedback comprises transmitting the HARQ feedback using a PUCCH resource having an index.

In a seventh aspect, alone or in combination with the sixth aspect, process 1500 includes determining the PUCCH resource based at least in part on a PUCCH indicator field of the DCI transmission.

In an eighth aspect, alone or in combination with one or more of the sixth through seventh aspects, process 1500 includes receiving an RRC message and determining the PUCCH resource based at least in part on the RRC message.

In a ninth aspect, alone or in combination with the eighth aspect, the RRC message indicates a TCI-PUCCH.

In a tenth aspect, alone or in combination with one or more of the first through ninth aspects, the DCI transmission has a DCI format 1_0, a DCI format 1_1, a DCI format 1_2, a DCI format 0_1, a DCI format 0_2, a DCI format 0_0, or a DCI format 2_x.

In an eleventh aspect, alone or in combination with one or more of the first through tenth aspects, the HARQ feedback comprises one ACK or NACK bit.

In a twelfth aspect, alone or in combination with one or more of the first through eleventh aspects, transmitting the HARQ feedback comprises transmitting the HARQ feedback using a dynamic HARQ-ACK codebook.

In a thirteenth aspect, alone or in combination with the twelfth aspect, the DCI transmission includes a DAI, and wherein the method further comprises determining a location in the dynamic HARQ-ACK codebook for the HARQ feedback based at least in part on the DAI.

In a fourteenth aspect, alone or in combination with the thirteenth aspect, the DAI comprises a counter DAI.

In a fifteenth aspect, alone or in combination with the thirteenth aspect, the DAI comprises a counter DAI and a total DAI.

In a sixteenth aspect, alone or in combination with one or more of the first through eleventh aspects, transmitting the HARQ feedback comprises transmitting the HARQ feedback using a static HARQ-ACK codebook.

In a seventeenth aspect, alone or in combination with the sixteenth aspect, the DCI transmission includes a TDRA field that indicates a virtual PDSCH, and wherein the method further comprises determining a location in the static HARQ-ACK codebook for the HARQ feedback based at least in part on the virtual PDSCH.

In an eighteenth aspect, alone or in combination with the seventeenth aspect, determining the location in the static HARQ-ACK codebook for the HARQ feedback comprises determining the location in the static HARQ-ACK codebook for the HARQ feedback based at least in part on a time domain allocation list that indicates the virtual PDSCH.

In a nineteenth aspect, alone or in combination with one or more of the seventeenth through eighteenth aspects, the TDRA field comprises an SLIV, and wherein the method further comprises determining a location in the static HARQ-ACK codebook for the HARQ feedback based at least in part on the SLIV.

In a twentieth aspect, alone or in combination with one or more of the sixteenth through nineteenth aspects, process 1500 includes receiving an RRC message that indicates an ACK/NACK location, and determining a location in the static HARQ-ACK codebook for the HARQ feedback based at least in part on the RRC message.

In a twenty-first aspect, alone or in combination with the twentieth aspect, the ACK/NACK location comprises a first bit of the static HARQ-ACK codebook.

In a twenty-second aspect, alone or in combination with one or more of the sixteenth through twenty-first aspects, process 1500 includes determining a location in the static HARQ-ACK codebook for the HARQ feedback based at least in part on an associated PDSCH occasion.

In a twenty-third aspect, alone or in combination with the twenty-second aspect, process 1500 includes receiving an RRC message that indicates the PDSCH occasion, wherein determining the location in the static HARQ-ACK codebook for the HARQ feedback comprises determining the location in the static HARQ-ACK codebook for the HARQ feedback based at least in part on the RRC message.

In a twenty-fourth aspect, alone or in combination with the twenty-second aspect, determining the location in the static HARQ-ACK codebook for the HARQ feedback comprises determining the location in the static HARQ-ACK codebook for the HARQ feedback based at least in part on a time domain allocation list that indicates the PDSCH occasion.

In a twenty-fifth aspect, alone or in combination with the sixteenth aspect, process 1500 includes determining a location in the static HARQ-ACK codebook for the HARQ feedback based at least in part on a dedicated bit location in the static HARQ-ACK codebook.

In a twenty-sixth aspect, alone or in combination with the twenty-fifth aspect, the DCI transmission indicates the dedicated bit location.

In a twenty-seventh aspect, alone or in combination with one or more of the twenty-fifth through twenty-sixth aspects, the dedicated bit location comprises a first bit of the static HARQ-ACK codebook or a last bit of the static HARQ-ACK codebook.

In a twenty-eighth aspect, alone or in combination with the sixteenth aspect, process 1500 includes appending one or more dedicated bits to an end of the static HARQ-ACK codebook based at least in part on the DCI transmission.

In a twenty-ninth aspect, alone or in combination with the twenty-eighth aspect, process 1500 includes determining that the unified TCI comprises an updated TCI, and wherein appending the one or more dedicated bits to the end of the static HARQ-ACK codebook comprises appending the one or more dedicated bits to the end of the static HARQ-ACK codebook based at least in part on determining that the unified TCI comprises an updated TCI.

In a thirtieth aspect, alone or in combination with one or more of the sixteenth through twenty-ninth aspects, process 1500 includes receiving an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

In a thirty-first aspect, alone or in combination with the thirtieth aspect, process 1500 includes determining a first location of the first ACK/NACK bit based at least in part on at least one of a first ACK/NACK location associated with the first DCI transmission or a first PDSCH occasion associated with the first DCI transmission, and determining a second location of the second ACK/NACK bit based at least in part on at least one of a second ACK/NACK location associated with the second DCI transmission or a second PDSCH occasion associated with the second DCI transmission.

In a thirty-second aspect, alone or in combination with the thirty-first aspect, the first DCI transmission indicates the at least one of the first ACK/NACK location associated with the first DCI transmission or the first PDSCH occasion associated with the first DCI transmission, and wherein the second DCI transmission indicates the at least one of the second ACK/NACK location associated with the second DCI transmission or the second PDSCH occasion associated with the second DCI transmission.

In a thirty-third aspect, alone or in combination with the thirty-second aspect, the first DCI transmission comprises a first TDRA field that indicates the at least one of the first ACK/NACK location associated with the first DCI transmission or the first PDSCH occasion associated with the first DCI transmission, and wherein the second DCI transmission comprises a second TDRA field that indicates the at least one of the second ACK/NACK location associated with the second DCI transmission or the second PDSCH occasion associated with the second DCI transmission.

In a thirty-fourth aspect, alone or in combination with the thirty-third aspect, the first TDRA field comprises a first SLIV that indicates the at least one of the first ACK/NACK location associated with the first DCI transmission or the first PDSCH occasion associated with the first DCI transmission, and wherein the second TDRA field comprises a second SLIV that indicates the at least one of the second ACK/NACK location associated with the second DCI transmission or the second PDSCH occasion associated with the second DCI transmission.

In a thirty-fifth aspect, alone or in combination with the thirty-first aspect, determining the first location of the first ACK/NACK bit based at least in part on at least one of the first ACK/NACK location associated with the first DCI transmission or the first PDSCH occasion associated with the first DCI transmission comprises determining the first location of the first ACK/NACK bit based at least in part on at least one of the first ACK/NACK location associated with the first DCI transmission or the first PDSCH occasion associated with the first DCI transmission based at least in part on a mapping rule that maps a first ID of a first indication in the first DCI transmission with the at least one of the first ACK/NACK location associated with the first DCI transmission or the first PDSCH occasion associated with the first DCI transmission.

In a thirty-sixth aspect, alone or in combination with the thirty-fifth aspect, the first ID comprises at least one of a first TCI codepoint or a first HARQ ID field.

In a thirty-seventh aspect, alone or in combination with the thirty-first aspect, determining the second location of the second ACK/NACK bit based at least in part on at least one of the second ACK/NACK location associated with the second DCI transmission or the second PDSCH occasion associated with the second DCI transmission comprises determining the second location of the second ACK/NACK bit based at least in part on at least one of the second ACK/NACK location associated with the second DCI transmission or the second PDSCH occasion associated with the second DCI transmission based at least in part on a mapping rule that maps a second ID of a second indication in the second DCI transmission with the at least one of the second ACK/NACK location associated with the second DCI transmission or the second PDSCH occasion associated with the second DCI transmission.

In a thirty-eighth aspect, alone or in combination with the thirty-seventh aspect, the second ID comprises at least one of a second TCI codepoint or a second HARQ ID field.

In a thirty-ninth aspect, alone or in combination with the thirtieth aspect, process 1500 includes determining a first location of the first ACK/NACK bit based at least in part on a dedicated fixed-size location appended to an end of the static HARQ-ACK codebook, and determining a second location of the first ACK/NACK bit based at least in part on the dedicated fixed-size location appended to an end of the static HARQ-ACK codebook.

In a fortieth aspect, alone or in combination with the thirty-ninth aspect, the dedicated fixed-size location comprises a number of bits that is greater than a number of received DCI transmissions indicating unified TCIs and without downlink assignments.

In a forty-first aspect, alone or in combination with the thirtieth aspect, process 1500 includes determining a first location of the first ACK/NACK bit based at least in part on a dynamic location appended to an end of the static HARQ-ACK codebook, and determining a second location of the first ACK/NACK bit based at least in part on the dynamic location appended to an end of the static HARQ-ACK codebook.

In a forty-second aspect, alone or in combination with one or more of the first through forty-first aspects, receiving the DCI transmission comprises receiving the DCI transmission associated with a PDSCH occasion, and wherein the method further comprises receiving a PDSCH transmission associated with the PDSCH occasion, wherein transmitting the HARQ feedback comprises transmitting the HARQ feedback based at least in part on a rule.

In a forty-third aspect, alone or in combination with one or more of the first through forty-second aspects, receiving the DCI transmission comprises receiving the DCI transmission associated with a PDSCH occasion, and wherein the method further comprises receiving a PDSCH transmission associated with the PDSCH occasion, wherein transmitting the HARQ feedback comprises transmitting the HARQ feedback based at least in part on increasing a size of a HARQ-ACK codebook used for transmitting the HARQ feedback.

In a forty-fourth aspect, alone or in combination with the forty-third aspect, process 1500 includes appending an ACK/NACK bit corresponding to the DCI transmission to an end of the HARQ-ACK codebook.

In a forty-fifth aspect, alone or in combination with the forty-third aspect, process 1500 includes appending an ACK/NACK bit corresponding to the DCI transmission adjacent an ACK/NACK bit corresponding to the PDSCH transmission in the HARQ-ACK codebook.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a base station, in accordance with the present disclosure. Example process 1600 is an example where the base station (e.g., base station 110) performs operations associated with feedback corresponding to unified TCIs in DCI without downlink assignments.

As shown in FIG. 16, in some aspects, process 1600 may include transmitting, in a first slot, a DCI transmission that indicates a unified TCI, wherein the DCI transmission does not include a downlink assignment (block 1610). For example, the base station (e.g., using transmission component 1804, depicted in FIG. 18) may transmit, in a first slot, a DCI transmission that indicates a unified TCI, wherein the DCI transmission does not include a downlink assignment, as described above.

As further shown in FIG. 16, in some aspects, process 1600 may include receiving HARQ feedback corresponding to the unified TCI, wherein the HARQ feedback comprises an ACK to indicate successful reception of the DCI transmission or a NACK to indicate a failed reception of the DCI transmission (block 1620). For example, the base station (e.g., using reception component 1802, depicted in FIG. 18) may receive HARQ feedback corresponding to the unified TCI, wherein the HARQ feedback comprises an ACK to indicate successful reception of the unified TCI in the DCI transmission or a NACK to indicate a failed reception of the unified TCI in the DCI transmission, as described above.

Process 1600 may include additional aspects, such as any single aspect or any combination of aspects described below and/or in connection with one or more other processes described elsewhere herein.

In a first aspect, receiving the HARQ feedback comprises receiving the HARQ feedback using a PUCCH transmission in a second slot, wherein the second slot is separated from the first slot by a number of slots indicated by a value of a slot parameter.

In a second aspect, alone or in combination with the first aspect, the DCI transmission comprises a PDSCH-to-HARQ feedback timing indicator field, and wherein the PDSCH-to-HARQ feedback timing indicator field indicates the value of the slot parameter.

In a third aspect, alone or in combination with the first aspect, the DCI transmission comprises a PDSCH-to-HARQ feedback timing indicator field and a TDRA field, and wherein a sum of a value of the TDRA field and the PDSCH-to-HARQ feedback timing indicator field indicates the value of the slot parameter.

In a fourth aspect, alone or in combination with the first aspect, process 1600 includes transmitting a radio resource control message that indicates the value of the slot parameter.

In a fifth aspect, alone or in combination with one or more of the first through fourth aspects, the value of the slot parameter is zero, and wherein the second slot comprises a last slot of the PUCCH transmission that overlaps with reception of the DCI transmission.

In a sixth aspect, alone or in combination with one or more of the first through fifth aspects, receiving the HARQ feedback comprises receiving the HARQ feedback using a PUCCH resource having an index.

In a seventh aspect, alone or in combination with the sixth aspect, a determination of the PUCCH resource is based at least in part on a PUCCH indicator field of the DCI transmission.

In an eighth aspect, alone or in combination with one or more of the sixth through seventh aspects, process 1600 includes transmitting an RRC message, wherein a determination of the PUCCH resource is based at least in part on the RRC message.

In a ninth aspect, alone or in combination with the eighth aspect, the RRC message indicates a TCI-PUCCH.

In a tenth aspect, alone or in combination with one or more of the first through ninth aspects, the DCI transmission has a DCI format 1_0, a DCI format 1_1, a DCI format 1_2, a DCI format 0_1, a DCI format 0_2, a DCI format 0_0, or a DCI format 2_x.

In an eleventh aspect, alone or in combination with one or more of the first through tenth aspects, the HARQ feedback comprises one ACK or NACK bit.

In a twelfth aspect, alone or in combination with one or more of the first through eleventh aspects, receiving the HARQ feedback comprises receiving the HARQ feedback using a dynamic HARQ-ACK codebook.

In a thirteenth aspect, alone or in combination with the twelfth aspect, the DCI transmission includes a DAI, and wherein a determination of a location in the dynamic HARQ-ACK codebook for the HARQ feedback is based at least in part on the DAI.

In a fourteenth aspect, alone or in combination with the thirteenth aspect, the DAI comprises a counter DAI.

In a fifteenth aspect, alone or in combination with the thirteenth aspect, the DAI comprises a counter DAI and a total DAI.

In a sixteenth aspect, alone or in combination with one or more of the first through eleventh aspects, receiving the HARQ feedback comprises receiving the HARQ feedback using a static HARQ-ACK codebook.

In a seventeenth aspect, alone or in combination with the sixteenth aspect, the DCI transmission includes a TDRA field that indicates a virtual PDSCH, and wherein a determination of a location in the static HARQ-ACK codebook for the HARQ feedback is based at least in part on the virtual PDSCH.

In an eighteenth aspect, alone or in combination with the seventeenth aspect, the determination of the location in the static HARQ-ACK codebook for the HARQ feedback is based at least in part on a time domain allocation list that indicates the virtual PDSCH.

In a nineteenth aspect, alone or in combination with one or more of the seventeenth through eighteenth aspects, the TDRA field comprises a SLIV, and wherein the method further comprises determining a location in the static HARQ-ACK codebook for the HARQ feedback based at least in part on the SLIV.

In a twentieth aspect, alone or in combination with the sixteenth aspect, process 1600 includes transmitting an RRC message that indicates an ACK/NACK location, wherein a determination of a location in the static HARQ-ACK codebook for the HARQ feedback is based at least in part on the RRC message.

In a twenty-first aspect, alone or in combination with the twentieth aspect, the ACK/NACK location comprises a first bit of the static HARQ-ACK codebook.

In a twenty-second aspect, alone or in combination with the sixteenth aspect, a determination of a location in the static HARQ-ACK codebook for the HARQ feedback is based at least in part on an associated PDSCH occasion.

In a twenty-third aspect, alone or in combination with the twenty-second aspect, process 1600 includes transmitting an RRC message that indicates the PDSCH occasion, wherein a determination of the location in the static HARQ-ACK codebook for the HARQ feedback is based at least in part on the RRC message.

In a twenty-fourth aspect, alone or in combination with one or more of the twenty-second through twenty-third aspects, a determination of the location in the static HARQ-ACK codebook for the HARQ feedback is based at least in part on a time domain allocation list that indicates the PDSCH occasion.

In a twenty-fifth aspect, alone or in combination with the sixteenth aspect, a determination of a location in the static HARQ-ACK codebook for the HARQ feedback is based at least in part on a dedicated bit location in the static HARQ-ACK codebook.

In a twenty-sixth aspect, alone or in combination with the twenty-fifth aspect, the DCI transmission indicates the dedicated bit location.

In a twenty-seventh aspect, alone or in combination with one or more of the twenty-fifth through twenty-sixth aspects, the dedicated bit location comprises a first bit of the static HARQ-ACK codebook or a last bit of the static HARQ-ACK codebook.

In a twenty-eighth aspect, alone or in combination with the sixteenth aspect, one or more dedicated bits is appended to an end of the static HARQ-ACK codebook based at least in part on the DCI transmission.

In a twenty-ninth aspect, alone or in combination with the twenty-eighth aspect, the one or more bits is appended based at least in part on determining that the unified TCI comprises an updated TCI.

In a thirtieth aspect, alone or in combination with one or more of the sixteenth through twenty-ninth aspects, process 1600 includes transmitting an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

In a thirty-first aspect, alone or in combination with one or more of the sixteenth through thirtieth aspects, a determination of a first location of the first ACK/NACK bit is based at least in part on at least one of a first ACK/NACK location associated with the first DCI transmission or a first PDSCH occasion associated with the first DCI transmission, and wherein a determination of a second location of the second ACK/NACK bit is based at least in part on at least one of a second ACK/NACK location associated with the second DCI transmission or a second PDSCH occasion associated with the second DCI transmission.

In a thirty-second aspect, alone or in combination with the thirty-first aspect, the first DCI transmission indicates the at least one of the first ACK/NACK location associated with the first DCI transmission or the first PDSCH occasion associated with the first DCI transmission, and wherein the second DCI transmission indicates the at least one of the second ACK/NACK location associated with the second DCI transmission or the second PDSCH occasion associated with the second DCI transmission.

In a thirty-third aspect, alone or in combination with the thirty-second aspect, the first DCI transmission comprises a first TDRA field that indicates the at least one of the first ACK/NACK location associated with the first DCI transmission or the first PDSCH occasion associated with the first DCI transmission, and wherein the second DCI transmission comprises a second TDRA field that indicates the at least one of the second ACK/NACK location associated with the second DCI transmission or the second PDSCH occasion associated with the second DCI transmission.

In a thirty-fourth aspect, alone or in combination with the thirty-second aspect, the first TDRA field comprises a first SLIV that indicates the at least one of the first ACK/NACK location associated with the first DCI transmission or the first PDSCH occasion associated with the first DCI transmission, and wherein the second TDRA field comprises a second SLIV that indicates the at least one of the second ACK/NACK location associated with the second DCI transmission or the second PDSCH occasion associated with the second DCI transmission.

In a thirty-fifth aspect, alone or in combination with the thirty-first aspect, a determination of the first location of the first ACK/NACK bit based at least in part on at least one of the first ACK/NACK location associated with the first DCI transmission or the first PDSCH occasion associated with the first DCI transmission is based at least in part on a mapping rule that maps a first ID of a first indication in the first DCI transmission with the at least one of the first ACK/NACK location associated with the first DCI transmission or the first PDSCH occasion associated with the first DCI transmission.

In a thirty-sixth aspect, alone or in combination with the thirty-fifth aspect, the first ID comprises at least one of a first TCI codepoint or a first HARQ ID field.

In a thirty-seventh aspect, alone or in combination with the thirty-first aspect, a determination of the second location of the second ACK/NACK bit based at least in part on at least one of the second ACK/NACK location associated with the second DCI transmission or the second PDSCH occasion associated with the second DCI transmission is based at least in part on a mapping rule that maps a second ID of a second indication in the second DCI transmission with the at least one of the second ACK/NACK location associated with the second DCI transmission or the second PDSCH occasion associated with the second DCI transmission.

In a thirty-eighth aspect, alone or in combination with the thirty-seventh aspect, the second ID comprises at least one of a second TCI codepoint or a second HARQ ID field.

In a thirty-ninth aspect, alone or in combination with the sixteenth aspect, a determination of a first location of the first ACK/NACK bit is based at least in part on a dedicated fixed-size location appended to an end of the static HARQ-ACK codebook, and wherein a determination of a second location of the first ACK/NACK bit is based at least in part on the dedicated fixed-size location appended to an end of the static HARQ-ACK codebook.

In a fortieth aspect, alone or in combination with the thirty-ninth aspect, the dedicated fixed-size location comprises a number of bits that is greater than a number of received DCI transmissions indicating unified TCIs and without downlink assignments.

In a forty-first aspect, alone or in combination with the sixteenth aspect, a determination of a first location of the first ACK/NACK bit is based at least in part on a dynamic location appended to an end of the static HARQ-ACK codebook, and wherein a determination of a second location of the first ACK/NACK bit is based at least in part on the dynamic location appended to an end of the static HARQ-ACK codebook.

In a forty-second aspect, alone or in combination with one or more of the first through forty-first aspects, transmitting the DCI transmission comprises transmitting the DCI transmission associated with a PDSCH occasion, wherein the method further comprises transmitting a PDSCH transmission associated with the PDSCH occasion, and wherein receiving the HARQ feedback comprises receiving the HARQ feedback based at least in part on a rule.

In a forty-third aspect, alone or in combination with one or more of the first through forty-second aspects, transmitting the DCI transmission comprises transmitting the DCI transmission associated with a PDSCH occasion, wherein the method further comprises transmitting a PDSCH transmission associated with the PDSCH occasion, and wherein receiving the HARQ feedback comprises receiving the HARQ feedback based at least in part on increasing a size of a HARQ-ACK codebook used for transmitting the HARQ feedback.

In a forty-fourth aspect, alone or in combination with the forty-third aspect, an ACK/NACK bit corresponding to the DCI transmission is appended to an end of the HARQ-ACK codebook.

In a forty-fifth aspect, alone or in combination with the forty-third aspect, an ACK/NACK bit corresponding to the DCI transmission is adjacent an ACK/NACK bit corresponding to the PDSCH transmission in the HARQ-ACK codebook.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
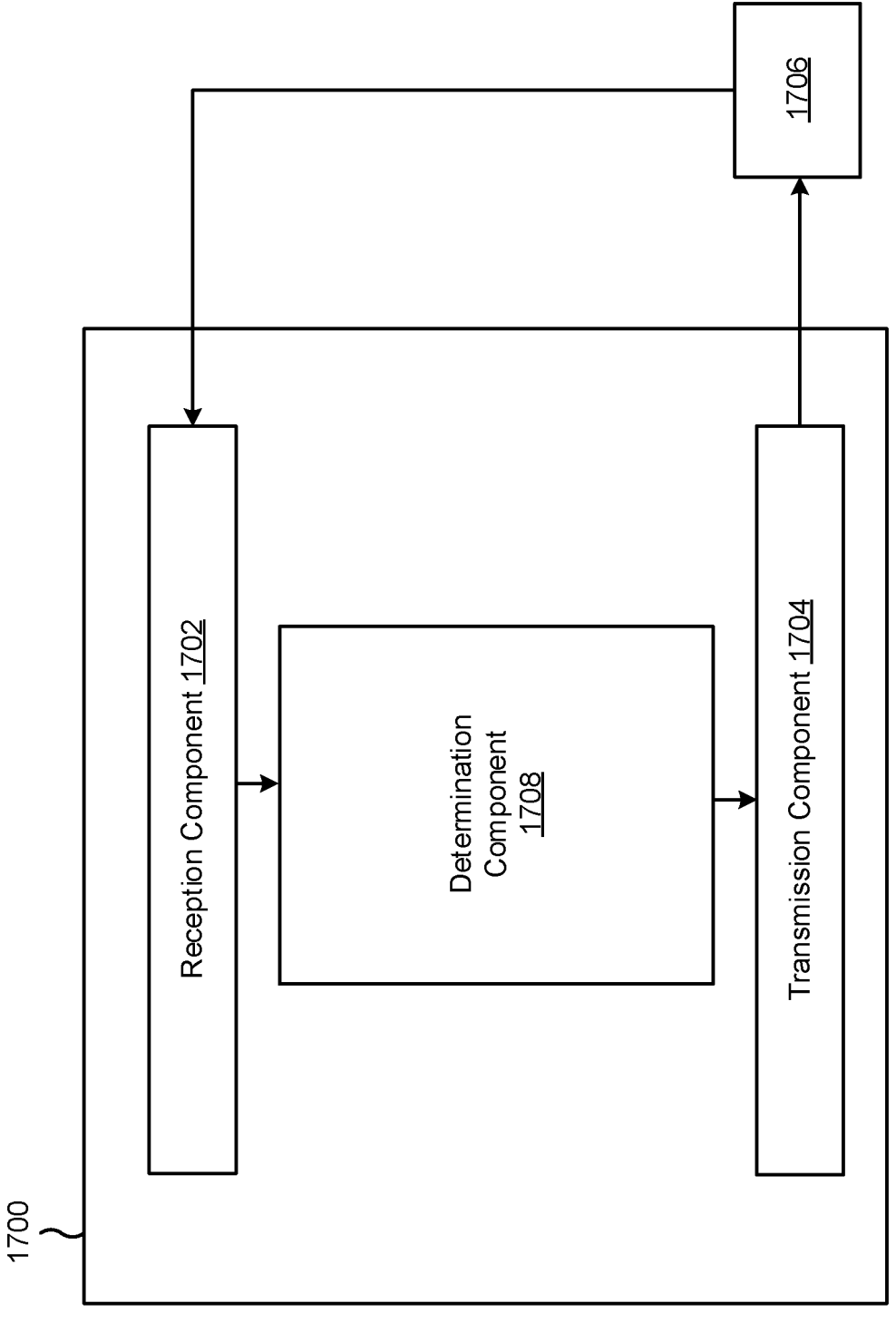
FIGS. 17 and 18 are block diagrams of example apparatuses for wireless communication, in accordance with the present disclosure.

FIG. 17 is a block diagram of an example apparatus 1700 for wireless communication. The apparatus 1700 may be a UE, or a UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708.

In some aspects, the apparatus 1700 may be configured to perform one or more operations described herein in connection with FIGS. 3-14. Additionally, or alternatively, the apparatus 1700 may be configured to perform one or more processes described herein, such as process 1500 of FIG. 15. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The reception component 1702 may receive, in a first slot, a DCI transmission that indicates a unified TCI, wherein the DCI transmission does not include a downlink assignment. The transmission component 1704 may transmit HARQ corresponding to the unified TCI, wherein the HARQ feedback comprises an ACK to indicate successful reception of the unified TCI in the DCI transmission or a NACK to indicate a failed reception of the unified TCI in the DCI transmission.

The reception component 1702 may receive a radio resource control message that indicates the value of the slot parameter.

The determination component 1708 may determine the PUCCH resource based at least in part on a PUCCH indicator field of the DCI transmission. In some aspects, the determination component 1708 may include one or more antennas, a modulator, a transmit MIMO processor, a transmit processor, a controller/processor, a memory, or a combination thereof, of the UE described above in connection with FIG. 2. In some aspects, the determination component 1708 may include the reception component 1702 and/or the transmission component 1704.

The reception component 1702 may receive an RRC message.

The determination component 1708 may determine the PUCCH resource based at least in part on the RRC message.

The reception component 1702 may receive an RRC message that indicates an ACK/NACK location.

The determination component 1708 may determine a location in the static HARQ-ACK codebook for the HARQ feedback based at least in part on the RRC message.

The determination component 1708 may determine a location in the static HARQ-ACK codebook for the HARQ feedback based at least in part on an associated PDSCH occasion.

The reception component 1702 may receive an RRC message that indicates the PDSCH occasion wherein determining the location in the static HARQ-ACK codebook for the HARQ feedback comprises determining the location in the static HARQ-ACK codebook for the HARQ feedback based at least in part on the RRC message.

The determination component 1708 may determine a location in the static HARQ-ACK codebook for the HARQ feedback based at least in part on a dedicated bit location in the static HARQ-ACK codebook.

The determination component 1708 may append one or more dedicated bits to an end of the static HARQ-ACK codebook based at least in part on the DCI transmission.

The determination component 1708 may determine that the unified TCI comprises an updated TCI, and wherein appending the one or more dedicated bits to the end of the static HARQ-ACK codebook comprises appending the one or more dedicated bits to the end of the static HARQ-ACK codebook based at least in part on determining that the unified TCI comprises an updated TCI.

The reception component 1702 may receive an additional DCI transmission that indicates an additional unified TCI, wherein the additional DCI transmission does not include a downlink assignment wherein the HARQ feedback comprises a first ACK/NACK bit corresponding to the DCI transmission and a second ACK/NACK bit corresponding to the additional DCI transmission.

The determination component 1708 may determine a first location of the first ACK/NACK bit based at least in part on at least one of a first ACK/NACK location associated with the first DCI transmission or a first PDSCH occasion associated with the first DCI transmission.

The determination component 1708 may determine a second location of the second ACK/NACK bit based at least in part on at least one of a second ACK/NACK location associated with the second DCI transmission or a second PDSCH occasion associated with the second DCI transmission.

The determination component 1708 may determine a first location of the first ACK/NACK bit based at least in part on a dedicated fixed-size location appended to an end of the static HARQ-ACK codebook.

The determination component 1708 may determine a second location of the first ACK/NACK bit based at least in part on the dedicated fixed-size location appended to an end of the static HARQ-ACK codebook.

The determination component 1708 may determine a first location of the first ACK/NACK bit based at least in part on a dynamic location appended to an end of the static HARQ-ACK codebook.

The determination component 1708 may determine a second location of the first ACK/NACK bit based at least in part on the dynamic location appended to an end of the static HARQ-ACK codebook.

The determination component 1708 may append an ACK/NACK bit corresponding to the DCI transmission to an end of the HARQ-ACK codebook.

The determination component 1708 may append an ACK/NACK bit corresponding to the DCI transmission adjacent an ACK/NACK bit corresponding to the PDSCH transmission in the HARQ-ACK codebook.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
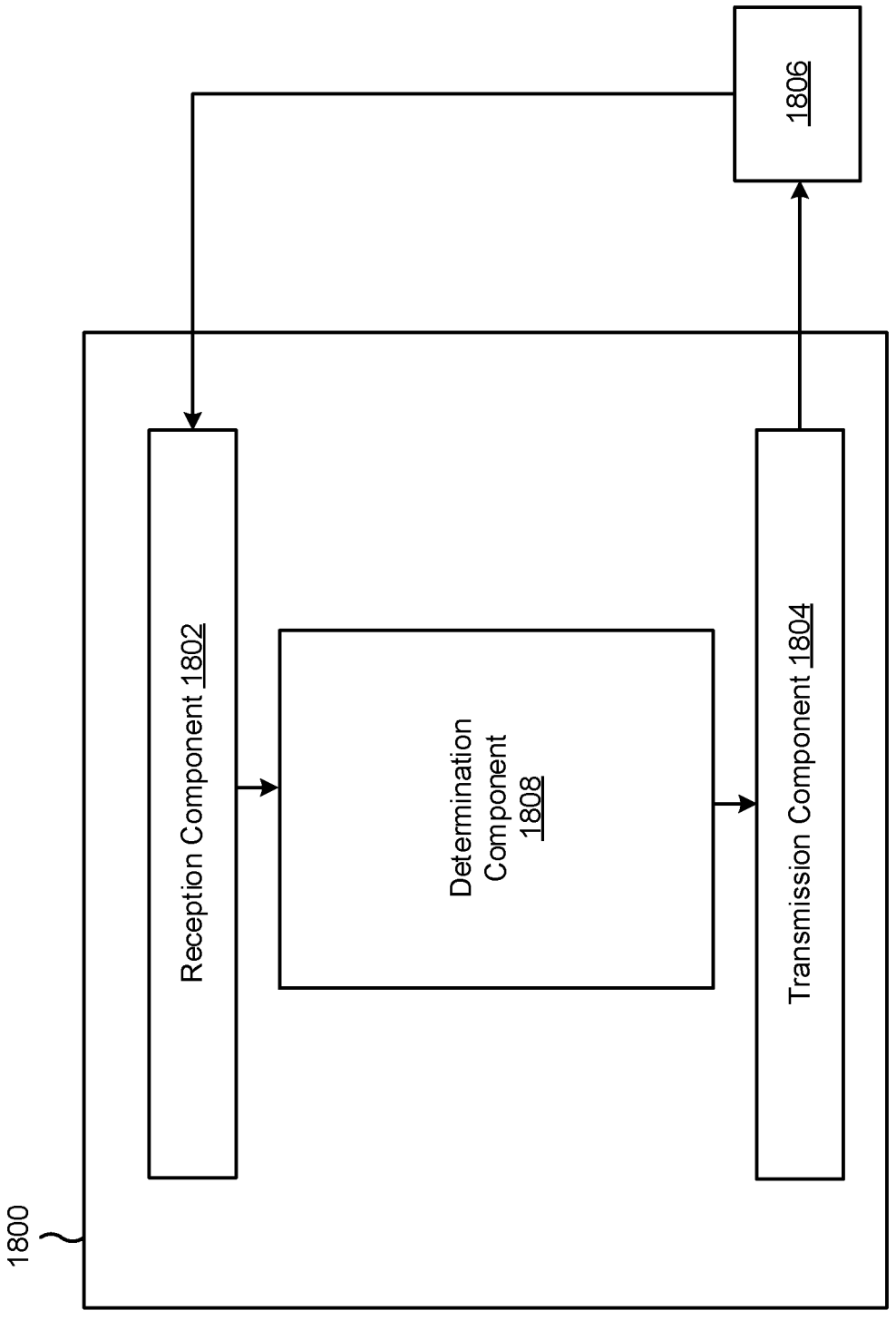

FIG. 18 is a block diagram of an example apparatus 1800 for wireless communication. The apparatus 1800 may be a base station, or a base station may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a determination component 1808.

In some aspects, the apparatus 1800 may be configured to perform one or more operations described herein in connection with FIGS. 3-14. Additionally, or alternatively, the apparatus 1800 may be configured to perform one or more processes described herein, such as process 1600 of FIG. 16. In some aspects, the apparatus 1800 and/or one or more components shown in FIG. 18 may include one or more components of the base station described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the base station described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the base station described above in connection with FIG. 2. In some aspects, the transmission component 1804 may be co-located with the reception component 1802 in a transceiver.

The transmission component 1804 may transmit, in a first slot, a DCI transmission that indicates a unified TCI, wherein the DCI transmission does not include a downlink assignment. The reception component 1802 may receive HARQ feedback corresponding to the unified TCI, wherein the HARQ feedback comprises an ACK to indicate successful reception of the unified TCI in the DCI transmission or a NACK to indicate a failed reception of the unified TCI in the DCI transmission.

The transmission component 1804 may transmit a radio resource control message that indicates the value of the slot parameter.

The transmission component 1804 may transmit an RRC message wherein a determination of the PUCCH resource is based at least in part on the RRC message.

The transmission component 1804 may transmit an RRC message that indicates an ACK/NACK location wherein a determination of a location in the static HARQ-ACK codebook for the HARQ feedback is based at least in part on the RRC message.

The transmission component 1804 may transmit an RRC message that indicates the PDSCH occasion wherein a determination of the location in the static HARQ-ACK codebook for the HARQ feedback is based at least in part on the RRC message.

The transmission component 1804 may transmit an additional DCI transmission that indicates an additional unified TCI, wherein the additional DCI transmission does not include a downlink assignment wherein the HARQ feedback comprises a first ACK/NACK bit corresponding to the DCI transmission and a second ACK/NACK bit corresponding to the additional DCI transmission.

The determination component 1808 may determine a unified TCI, PUCCH resources, PDCCH resources, and/or configurations, among other examples. In some aspects, the determination component 1808 may include one or more antennas, a modulator, a transmit MIMO processor, a transmit processor, a controller/processor, a memory, or a combination thereof, of the base station described above in connection with FIG. 2. In some aspects, the determination component 1808 may include the reception component 1802 and/or the transmission component 1804.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

The following provides an overview of some Aspects of the present disclosure:

Aspect 1: A method of wireless communication performed by a user equipment (UE), comprising: receiving, in a first slot, a downlink control information (DCI) transmission that indicates a unified transmission configuration indicator (TCI), wherein the DCI transmission does not include a downlink assignment; and transmitting hybrid automatic repeat request (HARQ) feedback corresponding to the unified TCI, wherein the HARQ feedback comprises an acknowledgment (ACK) to indicate successful reception of the unified TCI in the DCI transmission or a negative acknowledgement (NACK) to indicate a failed reception of the unified TCI in the DCI transmission.

Aspect 2: The method of Aspect 1, wherein transmitting the HARQ feedback comprises transmitting the HARQ feedback using a physical uplink control channel (PUCCH) transmission in a second slot, wherein the second slot is separated from the first slot by a number of slots indicated by a value of a slot parameter.

Aspect 3: The method of Aspect 2, wherein the DCI transmission comprises a physical downlink shared channel (PDSCH)-to-HARQ feedback timing indicator field, and wherein the PDSCH-to-HARQ feedback timing indicator field indicates the value of the slot parameter.

Aspect 4: The method of either of Aspects 2 or 3, wherein the DCI transmission comprises a physical downlink shared channel (PDSCH)-to-HARQ feedback timing indicator field and a time domain resource assignment (TDRA) field, and wherein a sum of a value of the TDRA field and the PDSCH-to-HARQ feedback timing indicator field indicates the value of the slot parameter.

Aspect 5: The method of any of Aspects 2-4, further comprising receiving a radio resource control message that indicates the value of the slot parameter.

Aspect 6: The method of any of Aspects 2-5, wherein the value of the slot parameter is zero, and wherein the second slot comprises a last slot of the PUCCH transmission that overlaps with reception of the DCI transmission.

Aspect 7: The method of any of Aspects 1-6, wherein transmitting the HARQ feedback comprises transmitting the HARQ feedback using a physical uplink control channel (PUCCH) resource having an index.

Aspect 8: The method of Aspect 7, further comprising determining the PUCCH resource based at least in part on a PUCCH indicator field of the DCI transmission.

Aspect 9: The method of either of Aspects 7 or 8, further comprising: receiving a radio resource control (RRC) message; and determining the PUCCH resource based at least in part on the RRC message.

Aspect 10: The method of Aspect 9, wherein the RRC message indicates a TCI-PUCCH.

Aspect 11: The method of any of Aspects 1-10, wherein the DCI transmission has a DCI format 1_0, a DCI format 1_1, a DCI format 1_2, a DCI format 0_1, a DCI format 0_2, a DCI format 0_0, or a DCI format 2_x.

Aspect 12: The method of any of Aspects 1-11, wherein the HARQ feedback comprises one ACK or NACK bit.

Aspect 13: The method of any of Aspects 1-12, wherein transmitting the HARQ feedback comprises transmitting the HARQ feedback using a dynamic HARQ-ACK codebook.

Aspect 14: The method of Aspect 13, wherein the DCI transmission includes a data assignment indicator (DAI), and wherein the method further comprises determining a location in the dynamic HARQ-ACK codebook for the HARQ feedback based at least in part on the DAI.

Aspect 15: The method of Aspect 14, wherein the DAI comprises a counter DAI.

Aspect 16: The method of Aspect 14, wherein the DAI comprises a counter DAI and a total DAI.

Aspect 17: The method of any of Aspects 1-12, wherein transmitting the HARQ feedback comprises transmitting the HARQ feedback using a static HARQ-ACK codebook.

Aspect 18: The method of Aspect 17, wherein the DCI transmission includes a time domain resource assignment (TDRA) field that indicates a virtual physical downlink shared channel (PDSCH), and wherein the method further comprises determining a location in the static HARQ-ACK codebook for the HARQ feedback based at least in part on the virtual PDSCH.

Aspect 19: The method of Aspect 18, wherein determining the location in the static HARQ-ACK codebook for the HARQ feedback comprises determining the location in the static HARQ-ACK codebook for the HARQ feedback based at least in part on a time domain allocation list that indicates the virtual PDSCH.

Aspect 20: The method of either of Aspects 18 or 19, wherein the TDRA field comprises a start and length indicator value (SLIV), and wherein the method further comprises determining a location in the static HARQ-ACK codebook for the HARQ feedback based at least in part on the SLIV.

Aspect 21: The method of any of Aspects 17-20, further comprising: receiving a radio resource control (RRC) message that indicates an ACK/NACK location; and determining a location in the static HARQ-ACK codebook for the HARQ feedback based at least in part on the RRC message.

Aspect 22: The method of Aspect 21, wherein the ACK/NACK location comprises a first bit of the static HARQ-ACK codebook.

Aspect 23: The method of any of Aspects 17-22, further comprising determining a location in the static HARQ-ACK codebook for the HARQ feedback based at least in part on an associated physical downlink shared channel (PDSCH) occasion.

Aspect 24: The method of Aspect 23, further comprising receiving a radio resource control (RRC) message that indicates the PDSCH occasion, wherein determining the location in the static HARQ-ACK codebook for the HARQ feedback comprises determining the location in the static HARQ-ACK codebook for the HARQ feedback based at least in part on the RRC message.

Aspect 25: The method of Aspect 23, wherein determining the location in the static HARQ-ACK codebook for the HARQ feedback comprises determining the location in the static HARQ-ACK codebook for the HARQ feedback based at least in part on a time domain allocation list that indicates the PDSCH occasion.

Aspect 26: The method of Aspect 17, further comprising determining a location in the static HARQ-ACK codebook for the HARQ feedback based at least in part on a dedicated bit location in the static HARQ-ACK codebook.

Aspect 27: The method of Aspect 26, wherein the DCI transmission indicates the dedicated bit location.

Aspect 28: The method of either of Aspects 26 or 27, wherein the dedicated bit location comprises a first bit of the static HARQ-ACK codebook or a last bit of the static HARQ-ACK codebook.

Aspect 29: The method of Aspect 17, further comprising appending one or more dedicated bits to an end of the static HARQ-ACK codebook based at least in part on the DCI transmission.

Aspect 30: The method of Aspect 29, further comprising determining that the unified TCI comprises an updated TCI, and wherein appending the one or more dedicated bits to the end of the static HARQ-ACK codebook comprises appending the one or more dedicated bits to the end of the static HARQ-ACK codebook based at least in part on determining that the unified TCI comprises an updated TCI.

Aspect 31: The method of any of Aspects 17-30, further comprising receiving an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

Aspect 32: The method of Aspect 31, further comprising: determining a first location of the first ACK/NACK bit based at least in part on at least one of a first ACK/NACK location associated with the first DCI transmission or a first physical downlink shared channel (PDSCH) occasion associated with the first DCI transmission; and determining a second location of the second ACK/NACK bit based at least in part on at least one of a second ACK/NACK location associated with the second DCI transmission or a second PDSCH occasion associated with the second DCI transmission.

Aspect 33: The method of Aspect 32, wherein the first DCI transmission indicates the at least one of the first ACK/NACK location associated with the first DCI transmission or the first PDSCH occasion associated with the first DCI transmission, and wherein the second DCI transmission indicates the at least one of the second ACK/NACK location associated with the second DCI transmission or the second PDSCH occasion associated with the second DCI transmission.

Aspect 34: The method of Aspect 33, wherein the first DCI transmission comprises a first time domain resource assignment (TDRA) field that indicates the at least one of the first ACK/NACK location associated with the first DCI transmission or the first PDSCH occasion associated with the first DCI transmission, and wherein the second DCI transmission comprises a second TDRA field that indicates the at least one of the second ACK/NACK location associated with the second DCI transmission or the second PDSCH occasion associated with the second DCI transmission.

Aspect 35: The method of Aspect 34, wherein the first TDRA field comprises a first start and length indicator value (SLIV) that indicates the at least one of the first ACK/NACK location associated with the first DCI transmission or the first PDSCH occasion associated with the first DCI transmission, and wherein the second TDRA field comprises a second SLIV that indicates the at least one of the second ACK/NACK location associated with the second DCI transmission or the second PDSCH occasion associated with the second DCI transmission.

Aspect 36: The method of Aspect 32, wherein determining the first location of the first ACK/NACK bit based at least in part on at least one of the first ACK/NACK location associated with the first DCI transmission or the first PDSCH occasion associated with the first DCI transmission comprises determining the first location of the first ACK/NACK bit based at least in part on at least one of the first ACK/NACK location associated with the first DCI transmission or the first PDSCH occasion associated with the first DCI transmission based at least in part on a mapping rule that maps a first identifier (ID) of a first indication in the first DCI transmission with the at least one of the first ACK/NACK location associated with the first DCI transmission or the first PDSCH occasion associated with the first DCI transmission.

Aspect 37: The method of Aspect 36, wherein the first ID comprises at least one of a first TCI codepoint or a first HARQ ID field.

Aspect 38: The method of Aspect 32, wherein determining the second location of the second ACK/NACK bit based at least in part on at least one of the second ACK/NACK location associated with the second DCI transmission or the second PDSCH occasion associated with the second DCI transmission comprises determining the second location of the second ACK/NACK bit based at least in part on at least one of the second ACK/NACK location associated with the second DCI transmission or the second PDSCH occasion associated with the second DCI transmission based at least in part on a mapping rule that maps a second identifier (ID) of a second indication in the second DCI transmission with the at least one of the second ACK/NACK location associated with the second DCI transmission or the second PDSCH occasion associated with the second DCI transmission.

Aspect 39: The method of Aspect 38, wherein the second ID comprises at least one of a second TCI codepoint or a second HARQ ID field.

Aspect 40: The method of Aspect 31, further comprising: determining a first location of the first ACK/NACK bit based at least in part on a dedicated fixed-size location appended to an end of the static HARQ-ACK codebook; and determining a second location of the first ACK/NACK bit based at least in part on the dedicated fixed-size location appended to an end of the static HARQ-ACK codebook.

Aspect 41: The method of Aspect 40, wherein the dedicated fixed-size location comprises a number of bits that is greater than a number of received DCI transmissions indicating unified TCIs and without downlink assignments.

Aspect 42: The method of Aspect 31, further comprising: determining a first location of the first ACK/NACK bit based at least in part on a dynamic location appended to an end of the static HARQ-ACK codebook; and determining a second location of the first ACK/NACK bit based at least in part on the dynamic location appended to an end of the static HARQ-ACK codebook.

Aspect 43: The method of any of Aspects 1-42, wherein receiving the DCI transmission comprises receiving the DCI transmission associated with a physical downlink shared channel (PDSCH) occasion, and wherein the method further comprises receiving a PDSCH transmission associated with the PDSCH occasion, transmitting the HARQ feedback comprises transmitting the HARQ feedback based at least in part on a rule.

Aspect 44: The method of any of Aspects 1-43, wherein receiving the DCI transmission comprises receiving the DCI transmission associated with a physical downlink shared channel (PDSCH) occasion, and wherein the method further comprises receiving a PDSCH transmission associated with the PDSCH occasion, transmitting the HARQ feedback comprises transmitting the HARQ feedback based at least in part on increasing a size of a HARQ-ACK codebook used for transmitting the HARQ feedback.

Aspect 45: The method of Aspect 44, further comprising appending an ACK/NACK bit corresponding to the DCI transmission to an end of the HARQ-ACK codebook.

Aspect 46: The method of Aspect 44, further comprising appending an ACK/NACK bit corresponding to the DCI transmission adjacent an ACK/NACK bit corresponding to the PDSCH transmission in the HARQ-ACK codebook.

Aspect 47: A method of wireless communication performed by a base station, comprising: transmitting, in a first slot, a downlink control information (DCI) transmission that indicates a unified transmission configuration indicator (TCI), wherein the DCI transmission does not include a downlink assignment; and receiving hybrid automatic repeat request (HARQ) feedback corresponding to the unified TCI, wherein the HARQ feedback comprises an acknowledgment (ACK) to indicate successful reception of the DCI transmission or a negative acknowledgement (NACK) to indicate a failed reception of the DCI transmission.

Aspect 48: The method of Aspect 47, wherein receiving the HARQ feedback comprises receiving the HARQ feedback using a physical uplink control channel (PUCCH) transmission in a second slot, wherein the second slot is separated from the first slot by a number of slots indicated by a value of a slot parameter.

Aspect 49: The method of Aspect 48, wherein the DCI transmission comprises a physical downlink shared channel (PDSCH)-to-HARQ feedback timing indicator field, and wherein the PDSCH-to-HARQ feedback timing indicator field indicates the value of the slot parameter.

Aspect 50: The method of Aspect 48, wherein the DCI transmission comprises a physical downlink shared channel (PDSCH)-to-HARQ feedback timing indicator field and a time domain resource assignment (TDRA) field, and wherein a sum of a value of the TDRA field and the PDSCH-to-HARQ feedback timing indicator field indicates the value of the slot parameter.

Aspect 51: The method of Aspect 48, further comprising transmitting a radio resource control message that indicates the value of the slot parameter.

Aspect 52: The method of any of Aspects 48-51, wherein the value of the slot parameter is zero, and wherein the second slot comprises a last slot of the PUCCH transmission that overlaps with reception of the DCI transmission.

Aspect 53: The method of any of Aspects 47-52, wherein receiving the HARQ feedback comprises receiving the HARQ feedback using a physical uplink control channel (PUCCH) resource having an index.

Aspect 54: The method of Aspect 53, wherein a determination of the PUCCH resource is based at least in part on a PUCCH indicator field of the DCI transmission.

Aspect 55: The method of either of Aspects 53 or 54, further comprising transmitting a radio resource control (RRC) message, wherein a determination of the PUCCH resource is based at least in part on the RRC message.

Aspect 56: The method of Aspect 55, wherein the RRC message indicates a TCI-PUCCH.

Aspect 57: The method of any of Aspects 47-56, wherein the DCI transmission has a DCI format 1_0, a DCI format 1_1, a DCI format 1_2, a DCI format 0_1, a DCI format 0_2, a DCI format 0_0, or a DCI format 2_x.

Aspect 58: The method of any of Aspects 47-57, wherein the HARQ feedback comprises one ACK or NACK bit.

Aspect 59: The method of any of Aspects 47-58, wherein receiving the HARQ feedback comprises receiving the HARQ feedback using a dynamic HARQ-ACK codebook.

Aspect 60: The method of Aspect 59, wherein the DCI transmission includes a data assignment indicator (DAI), and wherein a determination of a location in the dynamic HARQ-ACK codebook for the HARQ feedback is based at least in part on the DAI.

Aspect 61: The method of Aspect 60, wherein the DAI comprises a counter DAI.

Aspect 62: The method of Aspect 60, wherein the DAI comprises a counter DAI and a total DAI.

Aspect 63: The method of any of Aspects 47-58, wherein receiving the HARQ feedback comprises receiving the HARQ feedback using a static HARQ-ACK codebook.

Aspect 64: The method of Aspect 63, wherein the DCI transmission includes a time domain resource assignment (TDRA) field that indicates a virtual physical downlink shared channel (PDSCH), and wherein a determination of a location in the static HARQ-ACK codebook for the HARQ feedback is based at least in part on the virtual PDSCH.

Aspect 65: The method of Aspect 64, wherein the determination of the location in the static HARQ-ACK codebook for the HARQ feedback is based at least in part on a time domain allocation list that indicates the virtual PDSCH.

Aspect 66: The method of either of Aspects 64 or 65, wherein the TDRA field comprises a start and length indicator value (SLIV), and wherein the method further comprises determining a location in the static HARQ-ACK codebook for the HARQ feedback based at least in part on the SLIV.

Aspect 67: The method of Aspect 63, further comprising transmitting a radio resource control (RRC) message that indicates an ACK/NACK location, wherein a determination of a location in the static HARQ-ACK codebook for the HARQ feedback is based at least in part on the RRC message.

Aspect 68: The method of Aspect 67, wherein the ACK/NACK location comprises a first bit of the static HARQ-ACK codebook.

Aspect 69: The method of Aspect 63, wherein a determination of a location in the static HARQ-ACK codebook for the HARQ feedback is based at least in part on an associated physical downlink shared channel (PDSCH) occasion.

Aspect 70: The method of Aspect 69, further comprising transmitting a radio resource control (RRC) message that indicates the PDSCH occasion, wherein a determination of the location in the static HARQ-ACK codebook for the HARQ feedback is based at least in part on the RRC message.

Aspect 71: The method of either of Aspects 69 or 70, wherein a determination of the location in the static HARQ-ACK codebook for the HARQ feedback is based at least in part on a time domain allocation list that indicates the PDSCH occasion.

Aspect 72: The method of Aspect 63, wherein a determination of a location in the static HARQ-ACK codebook for the HARQ feedback is based at least in part on a dedicated bit location in the static HARQ-ACK codebook.

Aspect 73: The method of Aspect 72, wherein the DCI transmission indicates the dedicated bit location.

Aspect 74: The method of either of Aspects 72 or 73, wherein the dedicated bit location comprises a first bit of the static HARQ-ACK codebook or a last bit of the static HARQ-ACK codebook.

Aspect 75: The method of Aspect 63, wherein one or more dedicated bits is appended to an end of the static HARQ-ACK codebook based at least in part on the DCI transmission.

Aspect 76: The method of Aspect 75, wherein the one or more bits is appended based at least in part on determining that the unified TCI comprises an updated TCI.

Aspect 77: The method of any of Aspects 63-76, further comprising transmitting an additional DCI transmission that indicates an additional unified TCI, wherein the additional DCI transmission does not include a downlink assignment, wherein the HARQ feedback comprises a first ACK/NACK bit corresponding to the DCI transmission and a second ACK/NACK bit corresponding to the additional DCI transmission.

Aspect 78: The method of any of Aspects 63-77, wherein a determination of a first location of the first ACK/NACK bit is based at least in part on at least one of a first ACK/NACK location associated with the first DCI transmission or a first physical downlink shared channel (PDSCH) occasion associated with the first DCI transmission; and wherein a determination of a second location of the second ACK/NACK bit is based at least in part on at least one of a second ACK/NACK location associated with the second DCI transmission or a second PDSCH occasion associated with the second DCI transmission.

Aspect 79: The method of Aspect 78, wherein the first DCI transmission indicates the at least one of the first ACK/NACK location associated with the first DCI transmission or the first PDSCH occasion associated with the first DCI transmission, and wherein the second DCI transmission indicates the at least one of the second ACK/NACK location associated with the second DCI transmission or the second PDSCH occasion associated with the second DCI transmission.

Aspect 80: The method of Aspect 79, wherein the first DCI transmission comprises a first time domain resource assignment (TDRA) field that indicates the at least one of the first ACK/NACK location associated with the first DCI transmission or the first PDSCH occasion associated with the first DCI transmission, and wherein the second DCI transmission comprises a second TDRA field that indicates the at least one of the second ACK/NACK location associated with the second DCI transmission or the second PDSCH occasion associated with the second DCI transmission.

Aspect 81: The method of Aspect 79, wherein the first TDRA field comprises a first start and length indicator value (SLIV) that indicates the at least one of the first ACK/NACK location associated with the first DCI transmission or the first PDSCH occasion associated with the first DCI transmission, and wherein the second TDRA field comprises a second SLIV that indicates the at least one of the second ACK/NACK location associated with the second DCI transmission or the second PDSCH occasion associated with the second DCI transmission.

Aspect 82: The method of Aspect 78, wherein a determination of the first location of the first ACK/NACK bit based at least in part on at least one of the first ACK/NACK location associated with the first DCI transmission or the first PDSCH occasion associated with the first DCI transmission is based at least in part on a mapping rule that maps a first identifier (ID) of a first indication in the first DCI transmission with the at least one of the first ACK/NACK location associated with the first DCI transmission or the first PDSCH occasion associated with the first DCI transmission.

Aspect 83: The method of Aspect 82, wherein the first ID comprises at least one of a first TCI codepoint or a first HARQ ID field.

Aspect 84: The method of Aspect 78, wherein a determination of the second location of the second ACK/NACK bit based at least in part on at least one of the second ACK/NACK location associated with the second DCI transmission or the second PDSCH occasion associated with the second DCI transmission is based at least in part on a mapping rule that maps a second identifier (ID) of a second indication in the second DCI transmission with the at least one of the second ACK/NACK location associated with the second DCI transmission or the second PDSCH occasion associated with the second DCI transmission.

Aspect 85: The method of Aspect 84, wherein the second ID comprises at least one of a second TCI codepoint or a second HARQ ID field.

Aspect 86: The method of Aspect 63, wherein a determination of a first location of the first ACK/NACK bit is based at least in part on a dedicated fixed-size location appended to an end of the static HARQ-ACK codebook; and wherein a determination of a second location of the first ACK/NACK bit is based at least in part on the dedicated fixed-size location appended to an end of the static HARQ-ACK codebook.

Aspect 87: The method of Aspect 86, wherein the dedicated fixed-size location comprises a number of bits that is greater than a number of received DCI transmissions indicating unified TCIs and without downlink assignments.

Aspect 88: The method of Aspect 63, wherein a determination of a first location of the first ACK/NACK bit is based at least in part on a dynamic location appended to an end of the static HARQ-ACK codebook; and wherein a determination of a second location of the first ACK/NACK bit is based at least in part on the dynamic location appended to an end of the static HARQ-ACK codebook.

Aspect 89: The method of any of Aspects 47-88, wherein transmitting the DCI transmission comprises transmitting the DCI transmission associated with a physical downlink shared channel (PDSCH) occasion, wherein the method further comprises transmitting a PDSCH transmission associated with the PDSCH occasion, and wherein receiving the HARQ feedback comprises receiving the HARQ feedback based at least in part on a rule.

Aspect 90: The method of any of Aspects 47-89, wherein transmitting the DCI transmission comprises transmitting the DCI transmission associated with a physical downlink shared channel (PDSCH) occasion, wherein the method further comprises transmitting a PDSCH transmission associated with the PDSCH occasion, and wherein receiving the HARQ feedback comprises receiving the HARQ feedback based at least in part on increasing a size of a HARQ-ACK codebook used for transmitting the HARQ feedback.

Aspect 91: The method of Aspect 90, wherein an ACK/NACK bit corresponding to the DCI transmission is appended to an end of the HARQ-ACK codebook.

Aspect 92: The method of Aspect 90, wherein an ACK/NACK bit corresponding to the DCI transmission is adjacent an ACK/NACK bit corresponding to the PDSCH transmission in the HARQ-ACK codebook.

Aspect 93: An apparatus for wireless communication at a device, comprising a processor; memory coupled with the processor; and instructions stored in the memory and executable by the processor to cause the apparatus to perform the method of one or more Aspects of Aspects 1-46.

Aspect 94: A device for wireless communication, comprising a memory and one or more processors coupled to the memory, the memory and the one or more processors configured to perform the method of one or more Aspects of Aspects 1-46.

Aspect 95: An apparatus for wireless communication, comprising at least one means for performing the method of one or more Aspects of Aspects 1-46.

Aspect 96: A non-transitory computer-readable medium storing code for wireless communication, the code comprising instructions executable by a processor to perform the method of one or more Aspects of Aspects 1-46.

Aspect 97: A non-transitory computer-readable medium storing a set of instructions for wireless communication, the set of instructions comprising one or more instructions that, when executed by one or more processors of a device, cause the device to perform the method of one or more Aspects of Aspects 1-46.

Aspect 98: An apparatus for wireless communication at a device, comprising a processor; memory coupled with the processor; and instructions stored in the memory and executable by the processor to cause the apparatus to perform the method of one or more Aspects of Aspects 47-92.

Aspect 99: A device for wireless communication, comprising a memory and one or more processors coupled to the memory, the memory and the one or more processors configured to perform the method of one or more Aspects of Aspects 47-92.

Aspect 100: An apparatus for wireless communication, comprising at least one means for performing the method of one or more Aspects of Aspects 47-92.

Aspect 101: A non-transitory computer-readable medium storing code for wireless communication, the code comprising instructions executable by a processor to perform the method of one or more Aspects of Aspects 47-92.

Aspect 102: A non-transitory computer-readable medium storing a set of instructions for wireless communication, the set of instructions comprising one or more instructions that, when executed by one or more processors of a device, cause the device to perform the method of one or more Aspects of Aspects 47-92.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, in a first slot, a downlink control information (DCI) transmission that indicates a unified transmission configuration indicator (TCI), wherein the DCI transmission does not include a downlink assignment;
   determining a location in a hybrid automatic repeat request-acknowledgment (HARQ-ACK) codebook for a HARQ feedback corresponding to the unified TCI based at least in part on a value of an indicator in the DCI transmission; and
   transmitting the HARQ feedback corresponding to the unified TCI using the HARQ-ACK codebook, wherein the HARQ feedback comprises an ACK to indicate successful reception of the unified TCI in the DCI transmission or a negative acknowledgement (NACK) to indicate a failed reception of the unified TCI in the DCI transmission.

2. The method of claim 1, wherein transmitting the HARQ feedback comprises transmitting the HARQ feedback using a physical uplink control channel (PUCCH) transmission in a second slot, wherein the second slot is separated from the first slot by a number of slots indicated by a value of a slot parameter.

3. The method of claim 2, wherein the DCI transmission comprises a physical downlink shared channel (PDSCH)-to-HARQ feedback timing indicator field, and wherein the PDSCH-to-HARQ feedback timing indicator field indicates the value of the slot parameter.

4. The method of claim 2, wherein the DCI transmission comprises a physical downlink shared channel (PDSCH)-to-HARQ feedback timing indicator field and a time domain resource assignment (TDRA) field, and wherein a sum of a value of the TDRA field and the PDSCH-to-HARQ feedback timing indicator field indicates the value of the slot parameter.

5. The method of claim 1, wherein transmitting the HARQ feedback comprises transmitting the HARQ feedback using a physical uplink control channel (PUCCH) resource having an index.

6. The method of claim 1, wherein the DCI transmission has a DCI format 10, a DCI format 11, a DCI format 12, a DCI format 01, a DCI format 02, a DCI format 00, or a DCI format 2_x.

7. The method of claim 1, wherein the HARQ feedback comprises one ACK or NACK bit.

8. The method of claim 1, wherein the HARQ-ACK codebook is a dynamic HARQ-ACK codebook.

9. The method of claim 8, wherein the indicator is a data assignment indicator (DAI), and wherein the method further comprises determining the location in the HARQ-ACK codebook for the HARQ feedback based at least in part on the DAI.

10. The method of claim 1, wherein the HARQ-ACK codebook is a static HARQ-ACK codebook.

11. The method of claim 10, wherein the indicator is a time domain resource assignment (TDRA) field that indicates a virtual physical downlink shared channel (PDSCH), and wherein the method further comprises determining the location in the HARQ-ACK codebook for the HARQ feedback based at least in part on the virtual PDSCH.

12. The method of claim 10, further comprising: receiving a radio resource control (RRC) message that indicates an ACK/NACK location; and
  determining the location in the HARQ-ACK codebook for the HARQ feedback based at least in part on the RRC message.

13. The method of claim 10, further comprising determining the location in the HARQ-ACK codebook for the HARQ feedback based at least in part on an associated physical downlink shared channel (PDSCH) occasion.

14. The method of claim 10, further comprising determining the location in the HARQ-ACK codebook for the HARQ feedback based at least in part on a dedicated bit location in the HARQ-ACK codebook.

15. The method of claim 10, further comprising appending one or more dedicated bits to an end of the static HARQ-ACK codebook based at least in part on the DCI transmission.

16. The method of claim 10, further comprising receiving a first DCI transmission that indicates the unified TCI and a second DCI transmission that indicates an additional unified TCI, wherein the first DCI transmission and the second DCI transmission do not include a downlink assignment,
  wherein the HARQ feedback comprises a first ACK/NACK bit corresponding to the first DCI transmission and a second ACK/NACK bit corresponding to the second DCI transmission.

17. The method of claim 16, further comprising: determining a first location of the first ACK/NACK bit based at least in part on at least one of a first ACK/NACK location associated with the first DCI transmission or a first physical downlink shared channel (PDSCH) occasion associated with the first DCI transmission; and
  determining a second location of the second ACK/NACK bit based at least in part on at least one of a second ACK/NACK location associated with the second DCI transmission or a second PDSCH occasion associated with the second DCI transmission.

18. The method of claim 17, wherein the first DCI transmission indicates the at least one of the first ACK/NACK location associated with the first DCI transmission or the first PDSCH occasion associated with the first DCI transmission, and
  wherein the second DCI transmission indicates the at least one of the second ACK/NACK location associated with the second DCI transmission or the second PDSCH occasion associated with the second DCI transmission.

19. The method of claim 17, wherein determining the first location of the first ACK/NACK bit based at least in part on at least one of the first ACK/NACK location associated with the first DCI transmission or the first PDSCH occasion associated with the first DCI transmission comprises determining the first location of the first ACK/NACK bit based at least in part on at least one of the first ACK/NACK location associated with the first DCI transmission or the first PDSCH occasion associated with the first DCI transmission based at least in part on a mapping rule that maps a first identifier (ID) of a first indication in the first DCI transmission with the at least one of the first ACK/NACK location associated with the first DCI transmission or the first PDSCH occasion associated with the first DCI transmission.

20. The method of claim 17, wherein determining the second location of the second ACK/NACK bit based at least in part on at least one of the second ACK/NACK location associated with the second DCI transmission or the second PDSCH occasion associated with the second DCI transmission comprises determining the second location of the second ACK/NACK bit based at least in part on at least one of the second ACK/NACK location associated with the second DCI transmission or the second PDSCH occasion associated with the second DCI transmission based at least in part on a mapping rule that maps a second identifier (ID) of a second indication in the second DCI transmission with the at least one of the second ACK/NACK location associated with the second DCI transmission or the second PDSCH occasion associated with the second DCI transmission.

21. The method of claim 16, further comprising: determining a first location of the first ACK/NACK bit based at least in part on a dedicated fixed-size location appended to an end of the static HARQ-ACK codebook; and
  determining a second location of the first ACK/NACK bit based at least in part on the dedicated fixed-size location appended to an end of the static HARQ-ACK codebook.

22. The method of claim 16, further comprising: determining a first location of the first ACK/NACK bit based at least in part on a dynamic location appended to an end of the static HARQ-ACK codebook; and
  determining a second location of the first ACK/NACK bit based at least in part on the dynamic location appended to an end of the static HARQ-ACK codebook.

23. The method of claim 1, wherein receiving the DCI transmission comprises receiving the DCI transmission associated with a physical downlink shared channel (PDSCH) occasion, and wherein the method further comprises receiving a PDSCH transmission associated with the PDSCH occasion,
  wherein transmitting the HARQ feedback comprises transmitting the HARQ feedback based at least in part on a rule.

24. The method of claim 1, wherein receiving the DCI transmission comprises receiving the DCI transmission associated with a physical downlink shared channel (PDSCH) occasion, and wherein the method further comprises receiving a PDSCH transmission associated with the PDSCH occasion,
  wherein transmitting the HARQ feedback comprises transmitting the HARQ feedback based at least in part on increasing a size of the HARQ-ACK codebook used for transmitting the HARQ feedback.

25. A method of wireless communication performed by a base station, comprising:

transmitting, in a first slot, a downlink control information (DCI) transmission that indicates a unified transmission configuration indicator (TCI), wherein the DCI transmission does not include a downlink assignment; and receiving hybrid automatic repeat request (HARQ) feedback corresponding to the unified TCI in a HARQ-acknowledgment (HARQ-ACK) codebook, wherein the HARQ feedback comprises an ACK to indicate successful reception of the unified TCI in the DCI transmission or a negative acknowledgement (NACK) to indicate a failed reception of the unified TCI in the DCI transmission, wherein a location of the received HARQ feedback in the HARQ-ACK codebook is based at least in part on a value of an indicator in the DCI transmission.

26. The method of claim 25, wherein receiving the HARQ feedback comprises receiving the HARQ feedback using a physical uplink control channel (PUCCH) transmission in a second slot, wherein the second slot is separated from the first slot by a number of slots indicated by a value of a slot parameter.

27. A user equipment (UE) for wireless communication, comprising:

a memory; and one or more processors, coupled to the memory, configured to:

receive, in a first slot, a downlink control information (DCI) transmission that indicates a unified transmission configuration indicator (TCI), wherein the DCI transmission does not include a downlink assignment;

determine a location in a hybrid automatic repeat request-acknowledgment (HARQ-ACK) codebook for a HARQ feedback corresponding to the unified TCI based at least in part on a value of an indicator in the DCI transmission; and transmit the HARQ feedback corresponding to the unified TCI using the HARQ-ACK codebook, wherein the HARQ feedback comprises an ACK to indicate successful reception of the unified TCI in the DCI transmission or a negative acknowledgement (NACK) to indicate a failed reception of the unified TCI in the DCI transmission.

28. The UE of claim 27, wherein the one or more processors, to transmit the HARQ feedback, are configured to transmit the HARQ feedback using a physical uplink control channel (PUCCH) transmission in a second slot, wherein the second slot is separated from the first slot by a number of slots indicated by a value of a slot parameter.

29. A base station for wireless communication, comprising:

a memory; and one or more processors, coupled to the memory, configured to:

transmit, in a first slot, a downlink control information (DCI) transmission that indicates a unified transmission configuration indicator (TCI), wherein the DCI transmission does not include a downlink assignment; and receive hybrid automatic repeat request (HARQ) feedback corresponding to the unified TCI in a HARQ-acknowledgment (HARQ-ACK) codebook, wherein the HARQ feedback comprises an ACK to indicate successful reception of the unified TCI in the DCI transmission or a negative acknowledgement (NACK) to indicate a failed reception of the unified TCI in the DCI transmission, wherein a location of the received HARQ feedback in the HARQ-ACK codebook is based at least in part on a value of an indicator in the DCI transmission.

30. The base station of claim 29, wherein the one or more processors, to receive the HARQ feedback, are configured to receive the HARQ feedback using a physical uplink control channel (PUCCH) transmission in a second slot, wherein the second slot is separated from the first slot by a number of slots indicated by a value of a slot parameter.

* * * * *